United States Patent
Hanaoka et al.

(10) Patent No.: US 6,804,023 B1
(45) Date of Patent: Oct. 12, 2004

(54) INFORMATION COMMUNICATION SYSTEM

(75) Inventors: Hideyuki Hanaoka, Tokyo (JP); Ichiro Minami, Tokyo (JP); Ryoji Kuribayashi, Tokyo (JP); Takuya Kuwahara, Kawasaki (JP); Munenori Fujimoto, Tokyo (JP); Kazuma Yoshida, Oomiya (JP); Takashi Okiyama, Funabashi (JP)

(73) Assignee: Matsushita Graphic Communication Systems, Inc. (JP)

( * ) Notice: Subject to any disclaimer, the term of this patent is extended or adjusted under 35 U.S.C. 154(b) by 0 days.

(21) Appl. No.: 09/387,530

(22) Filed: Aug. 31, 1999

Related U.S. Application Data

(62) Division of application No. 08/045,241, filed on Apr. 13, 1993.

(30) Foreign Application Priority Data

| Apr. 17, 1992 | (JP) | ............................................. | 4-97617 |
| Apr. 17, 1992 | (JP) | ............................................. | 4-97618 |
| Nov. 4, 1992 | (JP) | ............................................. | 4-294827 |

(51) Int. Cl.$^7$ ............................................. G06F 15/00
(52) U.S. Cl. ....................... 358/1.16; 358/1.15; 358/404
(58) Field of Search .................................. 358/404, 442, 358/444, 443, 1.6, 1.16, 1.15, 407, 448, 4.43; 710/21; 707/3, 5; 705/23, 31

(56) References Cited

U.S. PATENT DOCUMENTS

| 5,068,888 | A | * | 11/1991 | Scherk et al. ........... 379/100.11 |
| 5,146,348 | A | * | 9/1992 | Kaneyama ................... 358/407 |
| 5,179,683 | A | * | 1/1993 | Murakami et al. ............ 710/21 |
| 5,274,468 | A | * | 12/1993 | Ojha ........................... 358/448 |
| 5,331,543 | A | * | 7/1994 | Yajima et al. ................. 705/31 |
| 5,819,235 | A | * | 10/1998 | Tamai et al. ................... 705/23 |
| 6,301,016 | B1 | * | 10/2001 | Matsueda et al. ............ 358/407 |

* cited by examiner

*Primary Examiner*—Twyler Lamb
(74) *Attorney, Agent, or Firm*—Rossi & Associates

(57) ABSTRACT

An appearance change of an information processing device, which has a plurality of operation modes and whose appearance is changed in accordance with change of operation mode, is displayed on a display screen as graphic data representing the appearance. When a memory card is extracted from the information processing device, an operation of the information processing device is reset to avoid a run away phenomenon. Furthermore, in an inquiry and communication operation, only necessary pages of resultant inquiry information are printed out at a time after the communication line is disconnected.

4 Claims, 36 Drawing Sheets

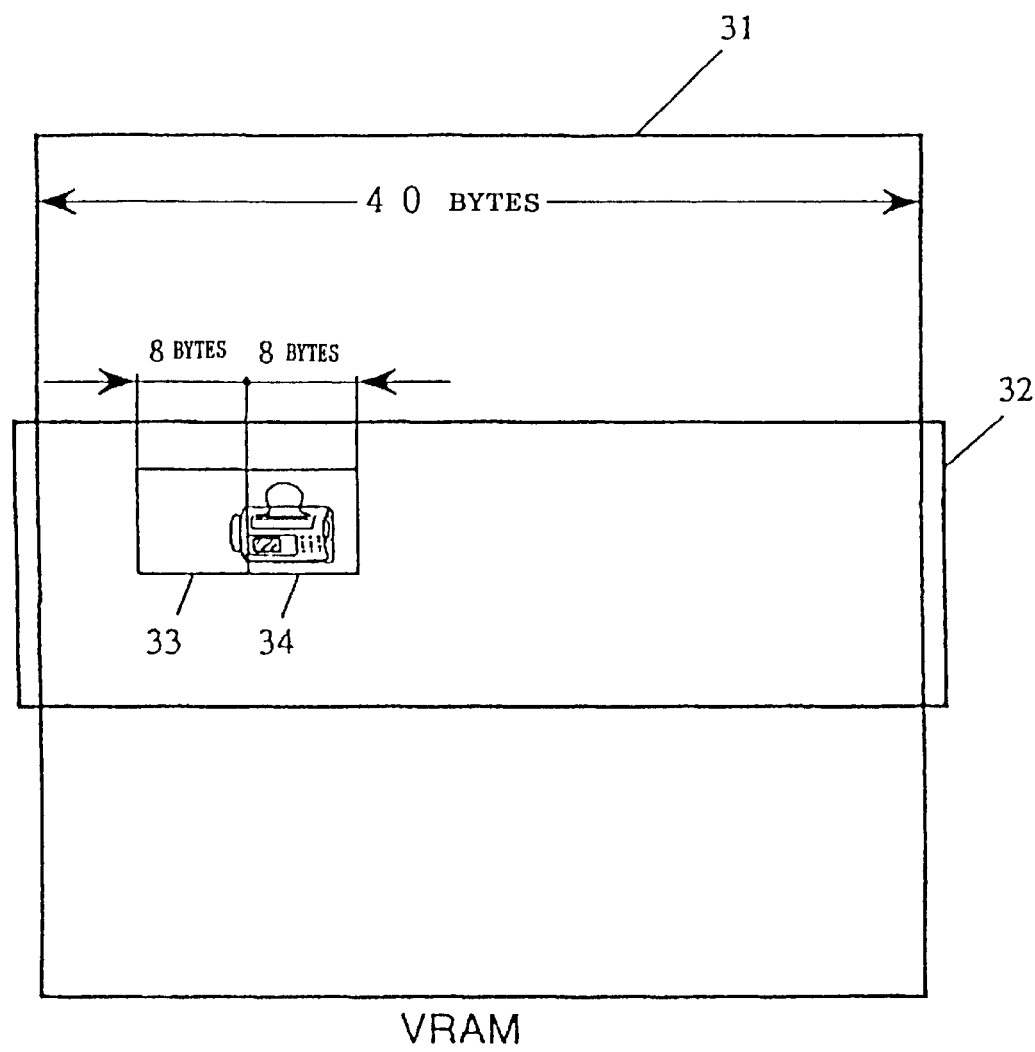

FIG. 35

```
                                              06/01 14:30
<< MAIN MENU >>
1: RECEIVE INFORMATION RETRIEVAL SERVICE
2: REGISTER/CHANGE CENTRALIZED INFORMATION
3: REGISTER/CHANGE AUTOMATIC INQUIRY
4: PRINT REGISTERED INFORMATION
5: EXECUTE SYSTEM SETTING

>SELECT MENU
                                                    [END]
```

| F1 | F2 | F3 | F4 | F5 |

FIG. 36

```
                                              06/01 14:30
<< DESIGNATION OF CENTRALIZED INFORMATION 1 >>

CENTER CODE          : [12345678]
    MEMO (CENTER NAME)   : [ MATSUSHITA SERVICE ]      53
    SUBSCRIBER NUMBER    : [98765432]
    ID   NUMBER          : [        ]

>ENTER ID NUMBER
                [REGISTER]              [END]
```

| F1 | F2 | F3 | F4 | F5 |

FIG. 37

```
                                    06/01  14:30
<< DESIGNATION OF CENTRALIZED INFORMATION 1 >>

CENTER CODE            :  [12345678]
    MEMO (CENTER NAME)     :  [ MATSUSHITA SERVICE    ]
    SUBSCRIBER NUMBER      :  [98765432]
    ID  NUMBER             :  [****]

>ENTER ID NUMBER

[CONNECT]         [REGISTER]           [END]
```

| F1 | F2 | F3 | F4 | F5 |

FIG. 38

```
                                    06/01  14:30
<<DESIGNATION OF CENTRALIZED ACCOUNT 1 >>

CENTER CODE            :  [12345678]
    MEMO (CENTER NAME)     :  [ MATSUSHITA SERVICE    ]
    SUBSCRIBER NUMBER      :  [98765432]
    ID  NUMBER             :  [****]

NOW ACCESSING: WAIT A MOMENT, PLEASE.
```

| F1 | F2 | F3 | F4 | F5 |

FIG. 39

```
* SERVICE MENU (CONTENTS) *    06/01 14:30

1 : PRODUCT INTRODUCTION
  2 : COMPANY GUIDANCE
  3 : TICKET INFORMATION
  4 : WEATHER FORECAST
  5 :
  6 :
  7 :

> SELECT SERVICE NUMBER
                              [NEXT PAGE] [END]
```

| F1 | F2 | F3 | F4 | F5 |
|----|----|----|----|----|

FIG. 40

```
* PRODUCT INTRODUCTION *    06/01 14:30

1 : U F — X X
  2 : U F — Y Y
  3 : E D — Z Z

> SELECT SERVICE NUMBER
                              [NEXT PAGE] [END]
```

| F1 | F2 | F3 | F4 | F5 |
|----|----|----|----|----|

FIG. 41

```
                                    06/01 14:30
 * GUIDE OF UF-XX *   1/4
                                    CENTER CODE
                                    (12345678)
PRODUCT NAME : U F — X X
SALES AGENT  : MATSUSHITA FAX CORP.   RESERVED PAGE
PRICE        : ¥ 7 7 7 , 0 0 0        5 / 4 0
DATE OF ISSUE: JUL. 7, 1992           OCCUPIED

CONTINUED
                                    [NEXT PAGE]   [ END ]
```

| F1 | F2 | F3 | F4 | F5 |

FIG. 42

```
                                    06/01 14:30
 * GUIDE OF UF-XX *   2/4
                                    CENTER CODE
ABSTRACT : THERMOSENSIBLE 6-SEC FAX APPARATUS (12345678)
           FOR AN ADVANCED & MULTIPLE FUNCTION
           FACSIMILE COMMUNICATION      RESERVED PAGE
                                        5 / 4 0
                                        OCCUPIED

CONTINUED
                                    [NEXT PAGE]   [ END ]
```

| F1 | F2 | F3 | F4 | F5 |

FIG. 43

```
                                    06/01  14:30
 * GUIDE OF UF-XX *    3/4
                                    CENTER CODE
CHARACTER:  ONE-TOUCH DIAL          (12345678)
            MEMORY INTERCEPTING
            CONFIDENTIAL COMMUNICATION   RESERVED PAGE
            SEQUENTIAL MULTIPLE ADDRESS  5 / 4 0
                                         OCCUPIED

CONTINUED
                                    [NEXT PAGE]  [END]
```

| F1 | F2 | F3 | F4 | F5 |

FIG. 44

```
                                    06/01  14:30
 * GUIDE OF UF-XX *    4/4
                                    CENTER CODE
REFERENCE : MATSUSHITA FAX CORPORATION   (12345678)
            OFFICE OF PUBLIC RELATION & PROPAGATION
                Tel                 RESERVED PAGE
            1 2 3 - 4 5 6 7         5 / 4 0
                                    OCCUPIED

[CONTENTS]   [CONTINUE]          [END]
```

| F1 | F2 | F3 | F4 | F5 |

FIG. 45

```
                                        06/01  14:30
* GUIDE OF UF-XX *    4/4
                                          CENTER CODE
    REFERENCE : MATSUSHITA FAX CORPORATION  [12345678]
               OFFICE OF PUBLIC RELATION & PROPAGATION
          Tel  123-4567    RESERVED PAGE
                                5 / 4 0
                                        OCCUPIED

>DO YOU WANT RESULTANT INFORMATION PRINTED ?

[YES]     [NO]
```

| F1 | F2 | F3 | F4 | F5 |

FIG. 46

```
                                        06/01  14:30
   THANK YOU FOR YOUR
   USING OUR SERVICE              CENTER CODE
                                   [12345678]

SERVICE CHARGE IS 200 YEN    RESERVED PAGE
                                   9 / 4 0
                                        OCCUPIED

NOW PRINTING: WAIT A MOMENT, PLEASE.
```

| F1 | F2 | F3 | F4 | F5 |

FIG. 47

```
                                          06/01 14:30
<< MAIN MENU >>

1: RECEIVE INFORMATION RETRIEVAL SERVICE

2: REGISTER/CHANGE CENTRALIZED INFORMATION

3: REGISTER/CHANGE AUTOMATIC INQUIRY

4: PRINT REGISTERED INFORMATION

5: EXECUTE SYSTEM SETTING

6: CONNECT LINE AGAIN

>SELECT MENU                                  [END]
```

| F1 | F2 | F3 | F4 | F5 |

FIG. 49

```
CENTER CODE    : [12345678]/MATSUSHITA SERVICE
SERVICE NAME   : PRODUCT INTRODUCTION
RETRIEVAL DATE : SEP. 11, 1992  15:30 ~ 15:45
TOTAL PAGES    : 4
```

* GUIDE OF UF-XX * 1/4
PRODUCT NAME : UF-XX
SALES AGENT  : MATSUSHITA FAX CORP.
PRICE        : 777,000 YEN
ISSUE OF DATE: JUL. 7, 1992
CONTINUED

* GUIDE OF UF-XX * 2/4
ABSTRACT: THERMOSENSIBLE 6-SEC FAX APPARATUS
         FOR AN ADVANCED & MULTIPLE FUNCTION
         FACSIMILE COMMUNICATION
CONTINUED

* GUIDE OF UF-XX * 3/4
CHARACTER: ONE-TOUCH DIAL
          MEMORY INTERCEPTING
          CONFIDENTIAL COMMUNICATION
          SEQUENTIAL MULTIPLE ADDRESS
CONTINUED

* GUIDE OF UF-XX * 4/4
REFERENCE: MATSUSHITA FAX CORPORATION
          OFFICE OF PUBLIC RELATION & PROPAGATION
          TEL 123-4567

FIG. 50

```
CENTER CODE   : [11223344] / MC RESEARCH
SERVICE NAME  : COMPANY GUIDANCE
RETRIEVAL DATE : SEP. 12, 1992    13:30 ~ 13:45
INFO. PAGES   : 2
```

```
* GUIDE OF MD CO. LTD. * 1/2
ABSTRACT: FOUNDED ON NOVEMBER 1970
         CAPITALIZED AT 15 BILLION YEN
         PROMISING COMPANY MANUFACTURING
         AND SELLING OA APPARATUS
```

```
*GUIDE OF MD CO. LTD. * 2/2
PROSPECTIVE EMPLOYEE: UNIVERSITY GRADUATES 30
                     HIGH SCHOOL GRADUATES 20
SALARY :       SALARIED WELL BY OUR STANDARDS
```

FIG. 51

```
CENTER CODE   : [11223344] / MC RESEARCH
SERVICE NAME  : COMPANY GUIDANCE
RETRIEVAL DATE : SEP. 12, 1992    13:30 ~ 13:45
INFO. PAGES   : 2

* GUIDE OF MD CO. LTD. * 1/2               *GUIDE OF MD CO. LTD. * 2/2
ABSTRACT: FOUNDED ON NOVEMBER 1970         PROSPECTIVE EMPLOYEE: UNIVERSITY GRADUATES 30
         CAPITALIZED AT 15 BILLION YEN                          HIGH SCHOOL GRADUATES 20
         PROMISING COMPANY MANUFACTURING   SALARY :       SALARIED WELL BY OUR STANDARDS
         AND SELLING OA APPARATUS
```

FIG. 52

```
CENTER CODE   : [11223344] / MC RESEARCH
SERVICE NAME  : COMPANY GUIDANCE
RETRIEVAL DATE : SEP. 12, 1992    13:30 ~ 13:45
INFO. PAGES   : 2

* GUIDE OF MD CO. LTD. * 1/2        *GUIDE OF MD CO. LTD. * 2/2

ABSTRACT: FOUNDED ON NOVEMBER 1970   PROSPECTIVE EMPLOYEE: UNIVERSITY  GRADUATES 30

CAPITALIZED AT 15 BILLION YEN              HIGH SCHOOL GRADUATES 20

PROMISING COMPANY MANUFACTURING  SALARY :     SALARIED WELL BY OUR STANDARDS

AND SELLING OA APPARATUS
```

FIG. 53

```
CENTER CODE   : [11223344] / MC RESEARCH
SERVICE NAME  : COMPANY GUIDANCE
RETRIEVAL DATE : SEP. 12, 1992    13:30 ~ 13:45
INFO. PAGES   : 2

* GUIDE OF MD CO. LTD. * 1/2        *GUIDE OF MD CO. LTD. * 2/2

ABSTRACT: FOUNDED ON NOVEMBER 1970   PROSPECTIVE EMPLOYEE: UNIVERSITY  GRADUATES 30

CAPITALIZED AT 15 BILLION YEN              HIGH SCHOOL GRADUATES 20

PROMISING COMPANY MANUFACTURING  SALARY :     SALARIED WELL BY OUR STANDARDS

AND SELLING OA APPARATUS
```

INFORMATION COMMUNICATION SYSTEM

This is a Division of application Ser. No. 08/045,241 filed Apr. 13, 1993.

BACKGROUND OF THE INVENTION

1. Field of the Invention

The present invention relates to an information processing system which has a plurality of operation modes and whose appearance changes in accordance with change of its operation mode.

The present invention further relates to an information processing system which runs a program supplied from an external portable memory means such as an IC card as well as a program installed therein.

Still further, the present invention relates to an information processing system which performs an inquiry and communication with a centralized information center via a communication line.

2. Description of the Prior Art

First of all, a display of an information processing system is becoming important as its function advances. A light emitting diode (LED) or a liquid crystal display (LCD) has been used for various displays. Among them is a tape travelling condition display in a cassette tape or a door open/close condition indicator of an automotive vehicle. However, the purpose of using such displays is chiefly realizing easy monitor without forcing an operator to change his/her position. In other word, a conventional display was not intended to apply to an advanced and multi-functioned apparatus which has a plurality of operation modes and whose appearance changes frequently in accordance with change of the operation mode.

Secondly, compatibility with external memory means is also important in expanding capability of an information processing system. In order to ensure the compatibility with the external memory means, one should be solved is a problem that an extraction of an external portable memory means from the information processing system may cause run away phenomenon.

Thirdly, effective use of the centralized data base will be very important in the future inquiry and communication system. In fact, recent development of information processing technologies has already realized banking systems, captain systems, personal computer systems etc. In view of recent rapid increase of communication terminals and data bases, the way of printing out resultant inquiry information would be a key for success in a future to effectively utilize the data base.

SUMMARY OF THE INVENTION

Accordingly, the present invention has a purpose, in view of above-described problems or disadvantages, to provide a novel information processing apparatus capable of displaying an appearance change of the apparatus as graphic data in accordance with change of operation modes.

In order to accomplish above purpose, a first aspect of the present invention provides an information processing system comprising: an information processing device which has a plurality of operation modes and whose appearance is changed in accordance with change of operation mode; a memory means for memorizing said operation modes in the form of graphic data, so that each graphic data represents an appearance of said information processing device in each operation mode; and a display means for reading out a graphic data, corresponding to an operation mode of the information processing device, from said memory means and displaying it on a display screen thereof.

Furthermore, a second aspect of the present invention provides an information processing system comprising: an information processing device which has a plurality of operation modes and whose appearance is changed in accordance with change of operation mode; a memory means for memorizing said operation modes in the form of a combination of divided graphic data, so that a combined graphic data represents an appearance of said information processing device in each operation mode; and a display means for reading out a set of graphic data, corresponding to an operation mode of the information processing device, from said memory means and displaying a composite image on a display screen thereof.

And, a third aspect of the present invention provides an information processing system comprising: an information processing device which has a plurality of operation modes and whose appearance is changed in accordance with change of operation mode; a memory means for memorizing said operation modes in the form of graphic data, so that each graphic data represents an appearance of said information processing device in each operation mode; said graphic data being memorized in an external character memory region independent of a character code memory region of said memory means; and a display means for reading out a graphic data, corresponding to an operation mode of the information processing device, from said memory means and displaying it on a display screen thereof.

Moreover, a fourth aspect of the present invention provides an information processing system comprising: an information processing device having a plurality of operation modes; a key means for selecting a specific function of said operation modes; a display means for displaying a screen image; a first memory means, including a character code memory region and an external character memory region, for memorizing a graphic data relating to said specific function in said external character memory region; a second memory means for memorizing as graphic data representing a function frame corresponding to said key; and a control means for composing a display image by combining graphic data stored in said first and second memory means and displaying a composite image on a display screen of said display means at a position adjacent to said key means.

Furthermore, the present invention has a purpose to prevent an information processing system from causing run away phenomenon when an external portable memory is extracted from the apparatus.

In order to accomplish this purpose, a fifth aspect of the present invention provides an information processing system comprising: a memory means for memorizing an initial condition of an information processing device; a portable memory means for memorizing an application program or data; an administration means for generating a detection signal when said portable memory means is extracted from said information processing device; and a control means for preventing said information processing device from running the program memorized in said portable memory and causing said information processing device to return to the initial condition, when said administration means generates said detection signal.

Yet further, a sixth aspect of the present invention provides ann information processing system comprising: an information processing device capable of running an operating program supplied from an external portable memory means; a memory means for memorizing an ID of said external portable memory; and a control means for checking whether or not an ID of an external portable memory newly inserted into the information processing device is identical with the latest ID memorized in said memory means and, if said IDs are identical with each other, allowing already memorized operation data relating to said external memory means to being dealt with as valid data.

Still further, a seventh aspect of the present invention provides an information processing system comprising: an information processing device capable of running an operating program supplied form an external portable memory means; a memory means for memorizing an ID of said external portable memory; and a control means for checking whether or not an ID of an external portable memory newly inserted into the information processing device is identical with the latest ID memorized in said memory means and, if said IDs are not identical with each other, prohibiting already memorized operation data relating to said external memory means to be dealt with as valid data.

Yet further, the present invention has a purpose to effectively perform an inquiry and communication operation.

In order to accomplish this purpose, an eighth aspect of the present invention provides an information processing system comprising: an information retrieval means for retrieving, via a communication line, a data base stored in an information center; a display means for displaying resultant data as inquiry information; an operation means for requesting a printout of said inquiry information displayed on said display means; a memory means for memorizing the inquiry information specified by said operation means; and a record means for printing out said inquiry information stored in said memory means at a time after the communication line is disconnected.

Also, a ninth aspect of the present invention provides an information processing system comprising: an information retrieval means for retrieving, via a communication line, a data base stored in an information center; an operation means for reserving an automatic printout of resultant inquiry information obtained by said information retrieval means; and a memory means for successively memorizing said inquiry information in response to a reservation by said operation means.

Still further, a tenth aspect of the present invention provides an information processing system comprising: an information retrieval means for retrieving, via a communication line, a data base stored in an information center; a display means for displaying resultant data as inquiry information; a memory means for memorizing the inquiry information displayed by said display means; and a record means for printing out a plurality of inquiry information stored in said memory means on a record medium so that recording areas of said plurality of inquiry information are arrayed along a main scanning direction.

Moreover, an eleventh aspect of the present invention provides an information processing system comprising: an operation means for acquiring retrieval information in accordance with a given service menu; an information retrieval means for retrieving, via a communication line, a data base stored in an information center; a memory means for memorizing resultant information as inquiry information; and a record means for printing out said inquiry information separately in accordance with said service menu.

And further, a twelfth aspect of the present invention provides an information processing system comprising: an operation means for acquiring retrieval information in accordance with a given service menu; an information retrieval means for retrieving, via a communication line, a data base stored in an information center; a display means for displaying resultant data as inquiry information; a memory means for memorizing said inquiry information displayed on said display means together with header information including at least a service name; and a record means for printing out said inquiry information recorded in said memory means together with said header information.

The above and other objects, features and advantages of the present invention will become more apparent from the following detailed description which is to be read in conjunction with the accompanying drawings.

BRIEF DESCRIPTION OF THE DRAWINGS

FIG. 5 is a schematic view showing a memory map of the VRAM, which illustrates the relationship between an entire memory space and the memory space provided for the LCD in which specifically illustrated is the graphic data corresponding to the appearance of the apparatus;

FIGS. 6 to 8 are flowcharts showing an operation of the information processing system in accordance with the first embodiment, in which FIG. 6 is a flowchart showing action from turning-on of an electric power to standing-by for various operations, FIGS. 7 and 8 are flowcharts showing action in the case where a memory card is connected to the apparatus;

FIGS. 10 through 12 are views showing initial screens displayed on the LCD respectively, in which FIG. 10 shows an initial screen displayed on the LCD when the memory card is not inserted into the apparatus while FIGS. 11 and 12 show initial screens displayed when the memory card is inserted;

FIG. 32(a) is a flowchart showing an inquiry and communication action of this embodiment, while

FIG. 35 is a view showing a main menu screen;

FIGS. 36 through 46 are views respectively showing a screen displayed in an information inquiry operation;

FIG. 47 is a view showing a main menu screen;

FIGS. 49 through 53 are views respectively showing a print format (or pattern) of the inquiry information.

DETAILED DESCRIPTION OF THE PREFERRED EMBODIMENT

Hereinafter, with reference to accompanying drawings, a preferred embodiment of the present invention will be explained in detail.

1. Overall System Constitution

Figure 1:
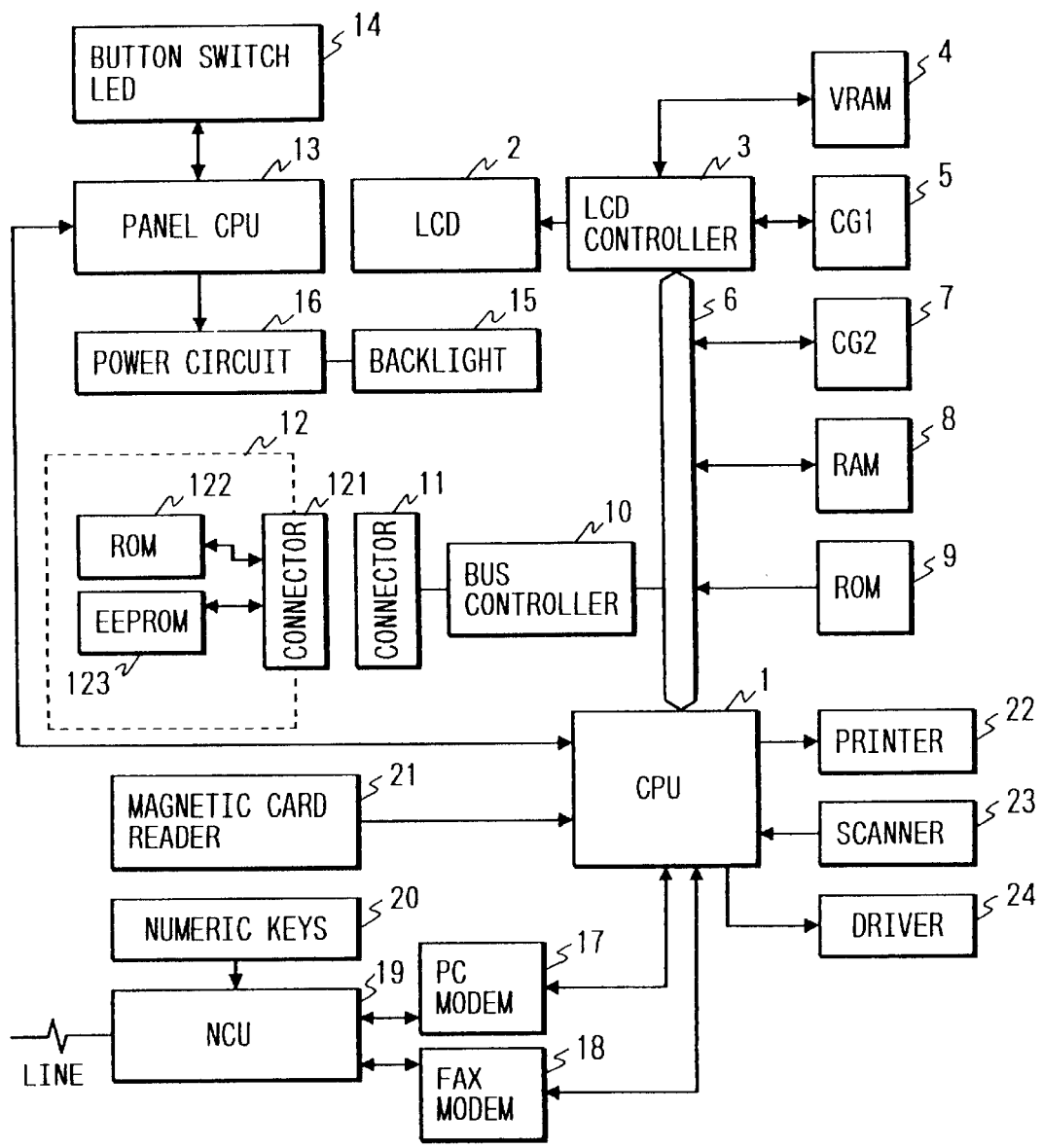
FIG. 1 is a schematic block diagram showing an information processing system in accordance with one embodiment of the present invention.

FIG. 1 is a schematic block diagram showing an information processing system in accordance with one embodiment of the present invention. A reference numeral 1 represents a CPU which performs an overall control of the entire system, A reference numeral 2 represents an LCD which displays physical change in appearance of the apparatus or the like. An LCD controller 3 controls the display on the LCD 2. A video random access memory (abbreviated by VRAM hereinafter) 4 is connected with the LCD controller 3. A first character generator (abbreviated by CG hereinafter) 5, generating characters to be displayed, is connected with the LCD controller 3. A reference numeral 6 represents a bus interposing between the CPU 1 and the LCD controller 3. A second character generator (abbreviated by CG) 7, generating characters to be printed, is connected to the bus 6.

A random access memory (abbreviated by RAM hereinafter) 8 memorizes flags representing various operating conditions in the system control by the CPU 1, and information obtained from external information center or bank answer system. A reed only memory (abbreviated by ROM hereinafter) 9 memorizes patterns showing apparatus appearance and the like which are displayed on the LCD 2. A bus controller 10 connects the bus 6 and an external portable memory such as a memory card which memorizes an application program or data. A reference numeral 11 represents a connector, which receives the external memory and connect it to the bus controller 10. A memory card 12, serving as an external memory, includes a connector 121 connecting the memory card 12 with the system main body through the connector 11, a ROM 122 accommodated therein, and an electrically erasable/programmable read only memory (abbreviated by EEPROM hereinafter) 123.

A reference numeral 13 represents a panel CPU which controls a display panel. The panel CPU 13 accompanies a group of button switches and LEDs which is disposed on the panel and collectively suffixed by a reference numeral 14. A backlight 15 irradiates the LCDs from the back, and an electric power circuit 16 actuates the backlight 15.

A PC modem 17, performing contraction/expansion of the character information, is connected to the CPU 1. A FAX modem 18, performing contraction/expansion of the image information, is connected to the CPU 1. A network control unit (abbreviated by NCU hereinafter) 19 controls a connection of the PC modem 17 and/or the FAX modem 18 to the public line. A bunch of numerical keys 20, provided for inputting telephone numbers or other information, is connected to the NCU 19.

The CPU 1 is further connected to a magnetic card reader 21 reading information recorded in a magnetic card, a printer 22 printing out information memorized in the RAM 8, a scanner 23, and a driver 24 driving a manuscript feeding motor and others.

Figure 2:
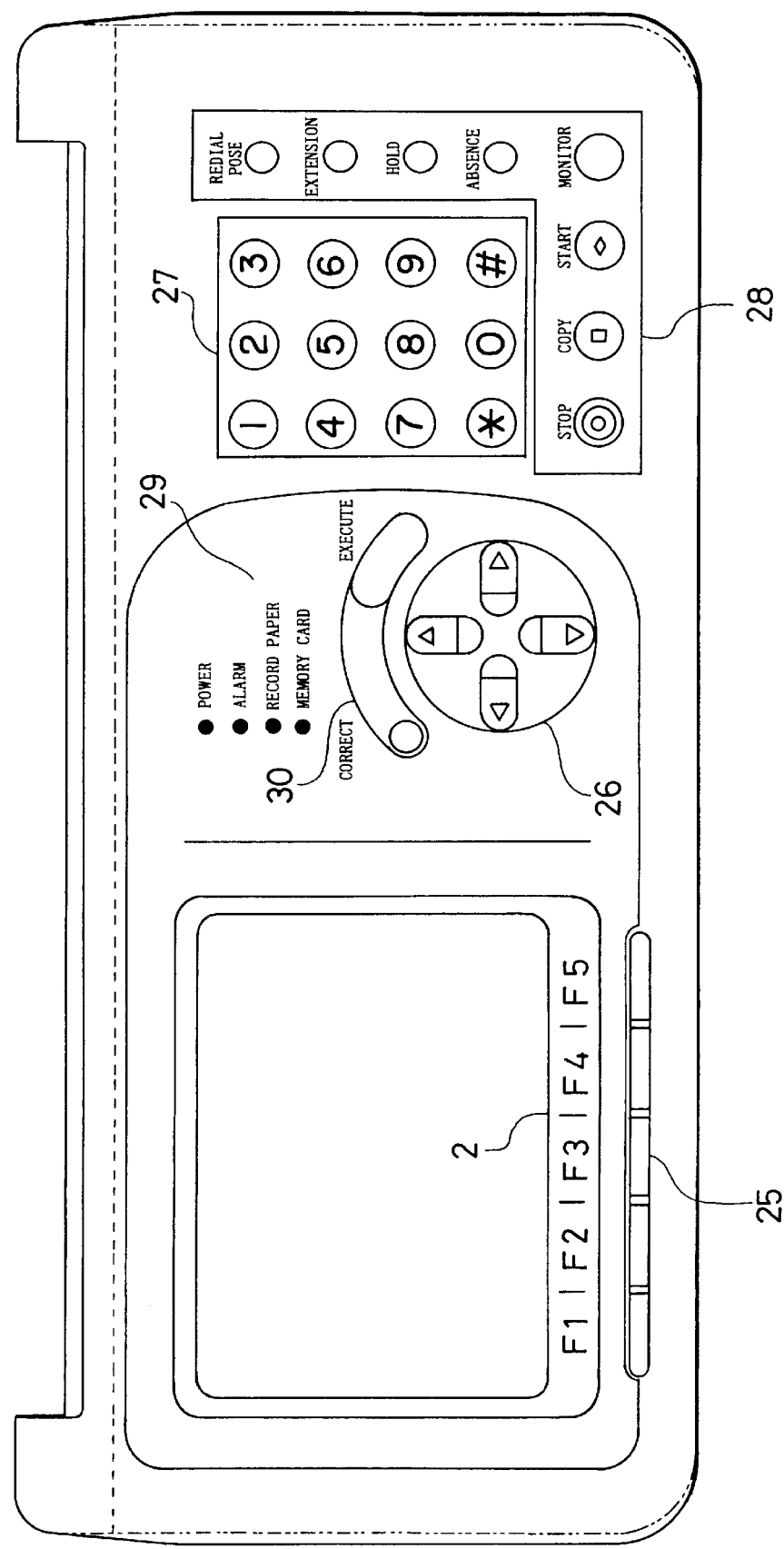
FIG. 2 is a plane view showing an operation panel equipped in the information processing system in accordance with this embodiment.

FIG. 2 is a plane view showing an operation panel equipped in the information processing system in accordance with this embodiment. In FIG. 2, the operation panel has a group of function switches 25 which is used for selecting e.g. a menu to be displayed on the LCD 2, a scroll button 26 used for displaying e.g. a FAX picture plane or the like on the LCD 2, numerical keys 27 used for inputting e.g. telephone numbers or the like, operation keys 28 used for operating FAX/TEL function, LED 29 for confirming system operation, and execution/correction key 30 for operating execution/correction of bank answering system etc.

2. Principle of Display Control

Figure 3:
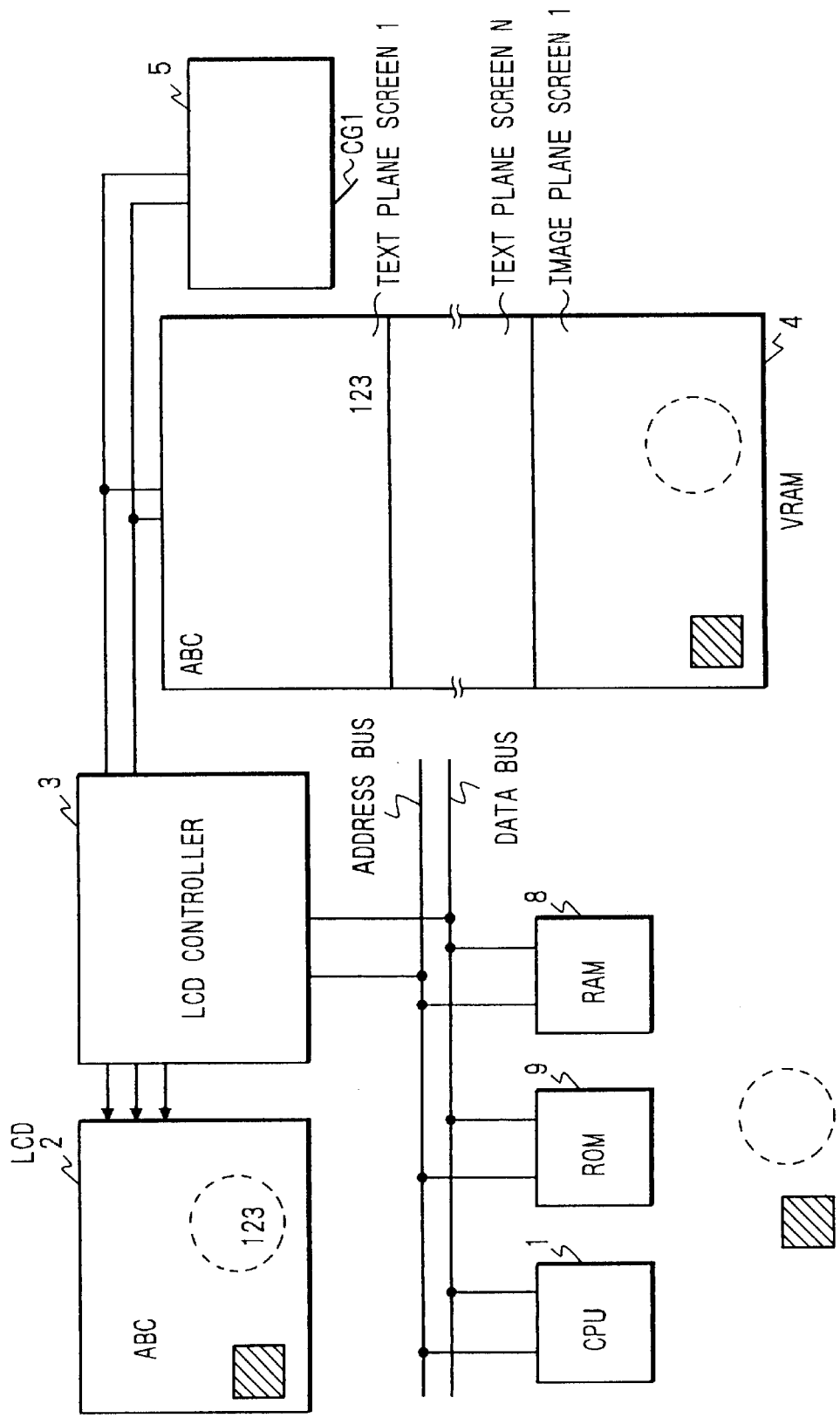
FIG. 3 is a schematic view showing a detailed display control of the information processing system in accordance with this embodiment.

FIG. 3 is a schematic view showing a detailed display control of the information processing system in accordance with this embodiment. In FIG. 3, the like components disclosed in FIG. 1 are suffixed by the same reference numerals.

Hereinafter, referring to FIG. 3, a principle of display control will be explained. Let's suppose that three different data, e.g. a character code "ABC", a shaded rectangle pattern, and a circle surrounding the character code "123", are displayed on the LCD 2.

In this embodiment, the VRAM 4 memorizes these data by separating them into a plurality of text plane screens #1~N and one image plane screen #1.

Upon display requirement, the CPU 1, first of all, reads out character codes "ABC", "123", and graphic data "rectangle" and "circle" from the ROM 9 and transmits them to the LCD controller 3. Then the LCD controller 3 obtains dot patterns corresponding to the received character codes "ABC", "123" from the first CG 5 and temporarily memorizes them in the text plane screen #1 of the VRAM 4. Furthermore, the LCD controller 3 temporarily memorizes the received graphic data "rectangle", "circle" in the image plane screen #1 of the VRAM 4. Thereafter, the LCD controller 3 sums or composes the text plane screen #1 and the image plane screen #1 and displays a composite image on the LCD 2.

Separating display data into a plurality of screens in this manner is advantageous in the realization of speedy change in display. For example, in order to respond to the request of changing "ABC" to "XYZ", this embodiment prepares two text plane screens #1 and #2. In this case the text plane screen #1 memorizes "ABC" and "123", while the text plane screen #2 memorizes "XYZ" and "123". This arrangement not only realizes the speedy display change by simply exchanging the text plane screen #1 for the text plane screen #2 but requires no necessity of rewriting content of the VRAM 4. Thus, no flickering will occur when the display screen is changed over.

Although this embodiment provides only one image plane screen, it is needless to say that it is possible to prepare a plurality of image plane screens in the VRAM 4.

Next explained in detail will be the way of displaying the appearance or physical condition change of the apparatus, which is to be displayed on the LCD 2. In this embodiment, the graphic data to be displayed on the LCD 2 is separated into two, right and left, regions having the same area, each of which is memorized in the VRAM 4. In order to effectively utilize the memory capacity of the ROM 9, it should be noted that the position of a split line in the separation above described is determined by taking account of frequency in appearance change of the apparatus.

Figures 4A, 4B, 4C:
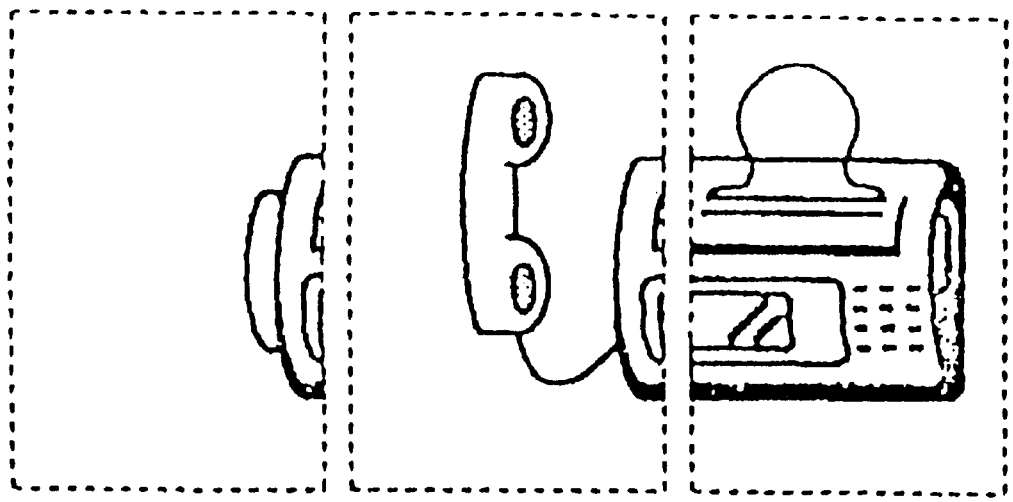
FIGS. 4(a) through 4(f) are views showing the way of storing graphic data to be displayed on the LCD in the ROM.
Figures 4D, 4E, 4F:
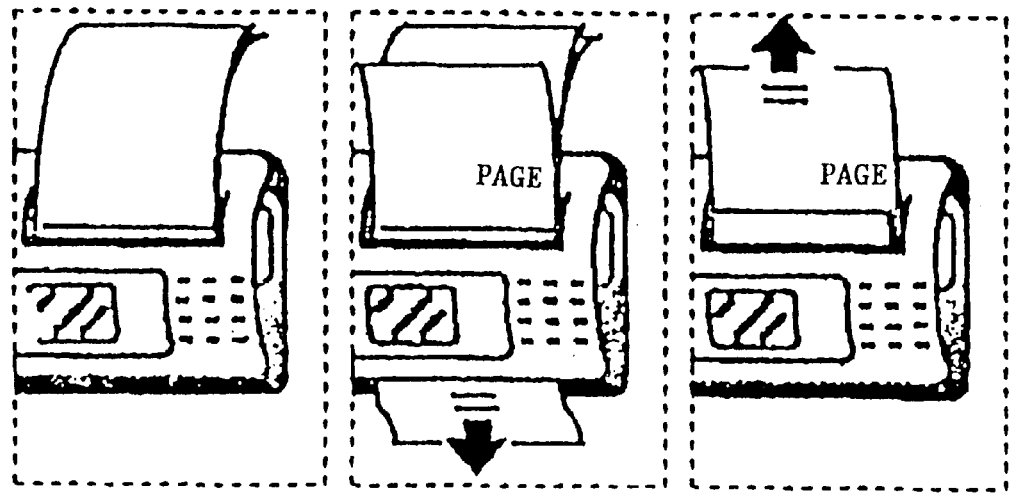

In more detail, it would be preferable that one of two, right and left, regions chiefly includes the part whose appearance is frequently changed. The other region would contains a common part whose appearance seldom change. In this embodiment, the right region memorizes the main body of the apparatus as shown in FIGS. 4(c)~4(f). Therefore, the center of the apparatus main body is offset toward right with respect to the split line between the right and left regions. On the other hand, the left region only memorizes a left edge of the apparatus as shown in FIGS. 4(a) and 4(b). The VRAM 4 can selectively combine right and left regions among these appearances shown FIGS. 4(a)~4(f). In other words, the VRAM 4 can give variation in appearance of the apparatus as many as the number of possible combination given by FIGS. 4(a)~4(f).

Furthermore, the memorization or administration of graphic data in this manner can realize the speedy change in display because the graphic data to be displayed are separated into two, right and left, regions. For example, if required to change only left edge of the apparatus, display change can be quickly performed by simply exchanging FIG. 4(a) for FIG. 4(b).

Next, the way of completing one appearance view, performed in the LCD controller 3, by summing or composing the divided graphic data will be explained in detail.

FIG. 5 is a schematic view showing a memory map of the VRAM 4, which illustrates the relationship between an entire memory space and the memory space provided for the LCD 2. This memory space for the LCD 2 specifically illustrates the graphic data corresponding to the appearance of the apparatus.

In FIG. 5, a reference numeral 31 represents the entire memory space of the VRAM 4, and a reference numeral 32 represents the memory space prepared for the LCD 2. A reference numeral 33 represents the graphic data exclusively showing the left edge of the apparatus, and a reference numeral 34 represents the graphic data exclusively showing the main body of the apparatus. That is, the memory space that the LCD 2 displays under the control of the LCD controller 3 is identical with the space of these graphic data 33, 34.

Referring now to FIG. 5, how the LCD controller 3 displays the appearance of the apparatus on the LCD 2 will be explained. The VRAM 4 used in this embodiment has 40 bytes per lateral line as shown in FIG. 5. Meanwhile, the right and left graphic data 33, 34 have respectively 8 bytes per lateral line.

In order to display the left pattern of the appearance prior to the right pattern, the CPU 1 sends the LCD controller 3 the command specifying graphic data to be displayed and its address on the VRAM 4. The LCD controller 3 obtains the dot pattern corresponding to the specified graphic data from the ROM 9 and transfers this dot pattern to the specified address on the VRAM 4. In this case the VRAM 4 has 40 bytes per lateral line as described above, while the right and left graphic data, showing appearance of the apparatus, are stored in the ROM 9 to have 8 bytes per lateral line respectively.

With this arrangement, every time the LCD controller 3 transfers an 8 bytes graphic data corresponding to the left appearance of the apparatus, the LCD controller 3 renews a start address designating 8 bytes for the next graphic data by simply adding 40 bytes. Accordingly the start address always coincides with previous one in the lateral direction; therefore the transfer of divided graphic data to the VRAM 4 can be simplified.

Next, the transfer of right pattern of the appearance is carried out in the same manner. After the graphic data to be display and its address are specified, the specified graphic data can be simply transferred to the VRAM 4 through the similar procedure.

If this embodiment is modified to adopt a plurality of image plane screens, these right and left graphic data can be memorized into different image plane screens. This modification will allow the speedy change in display because the LCD controller 3 needs not rewrite the content of the VRAM 4 every time the display content is changed. All thing to do for the LCD controller 3 is to select either one of image plane screens to be displayed. Furthermore, it is needless to say that the graphic data can be divided into three or more. In this case, it should be also noted that the split lines of the graphic data are determined by taking account of frequency of physical change in appearance of the apparatus in order to save the memory in the ROM 9.

3. Overall Display Operation

Figure 6:
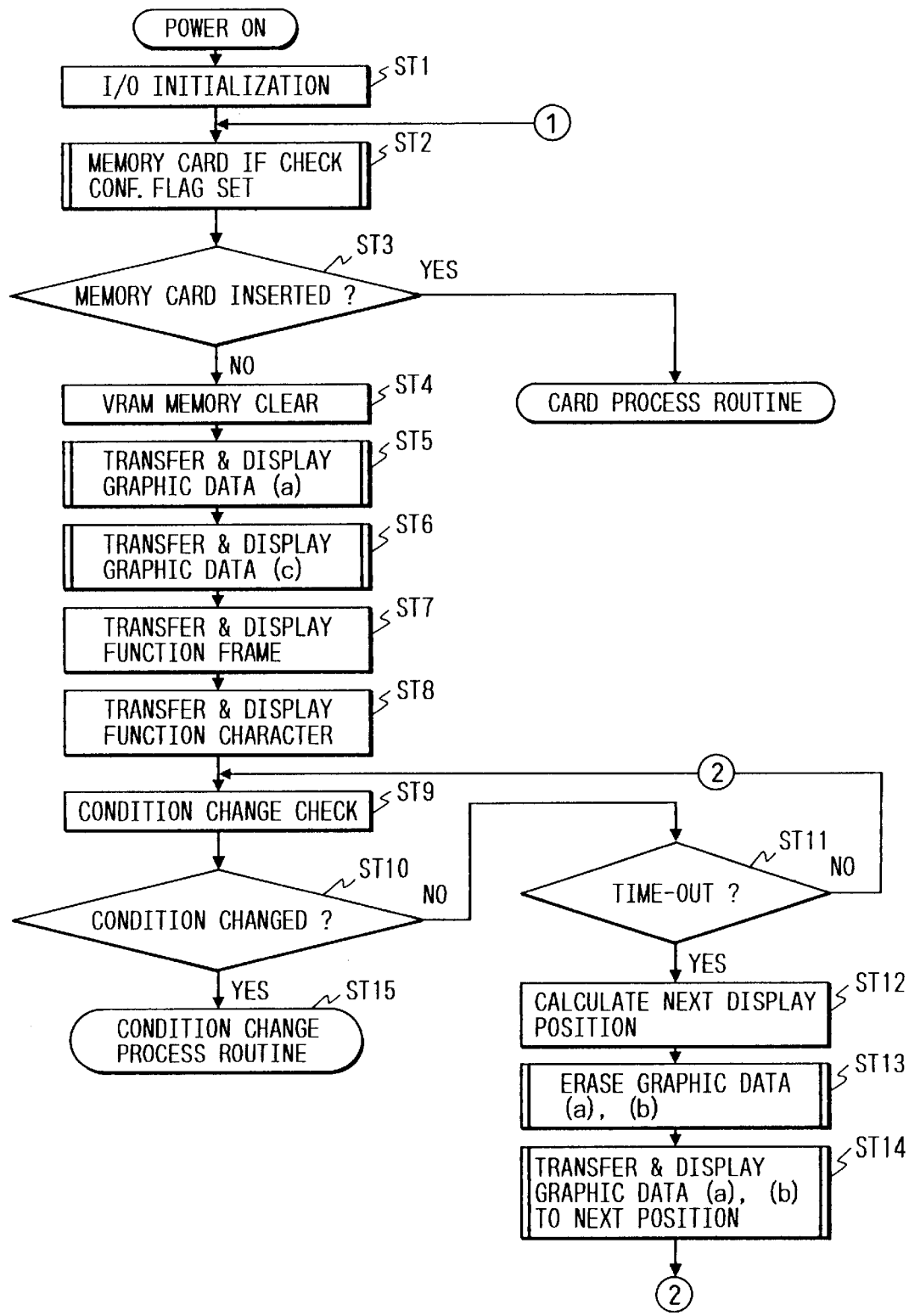
Figure 7:
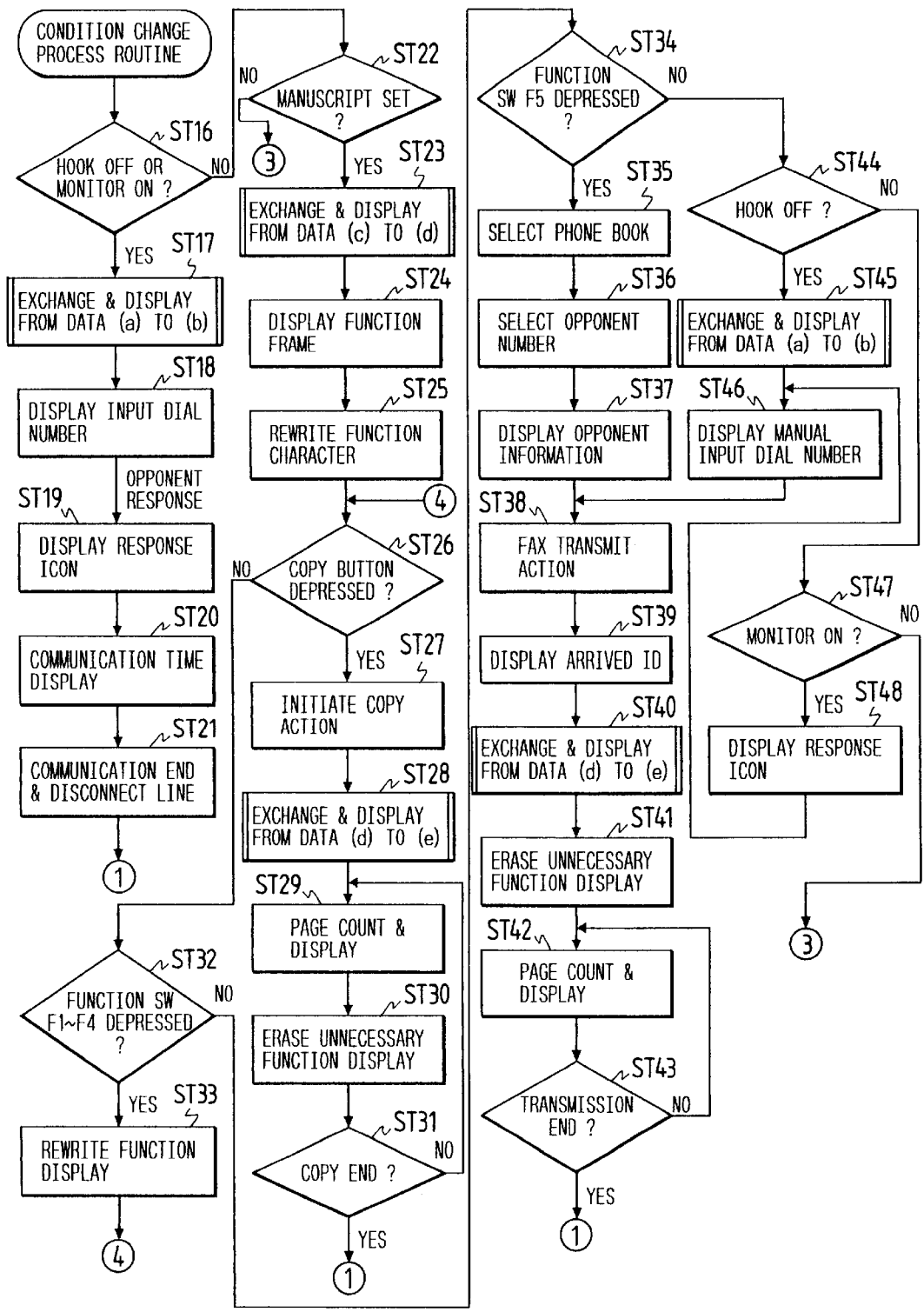
Figure 8:
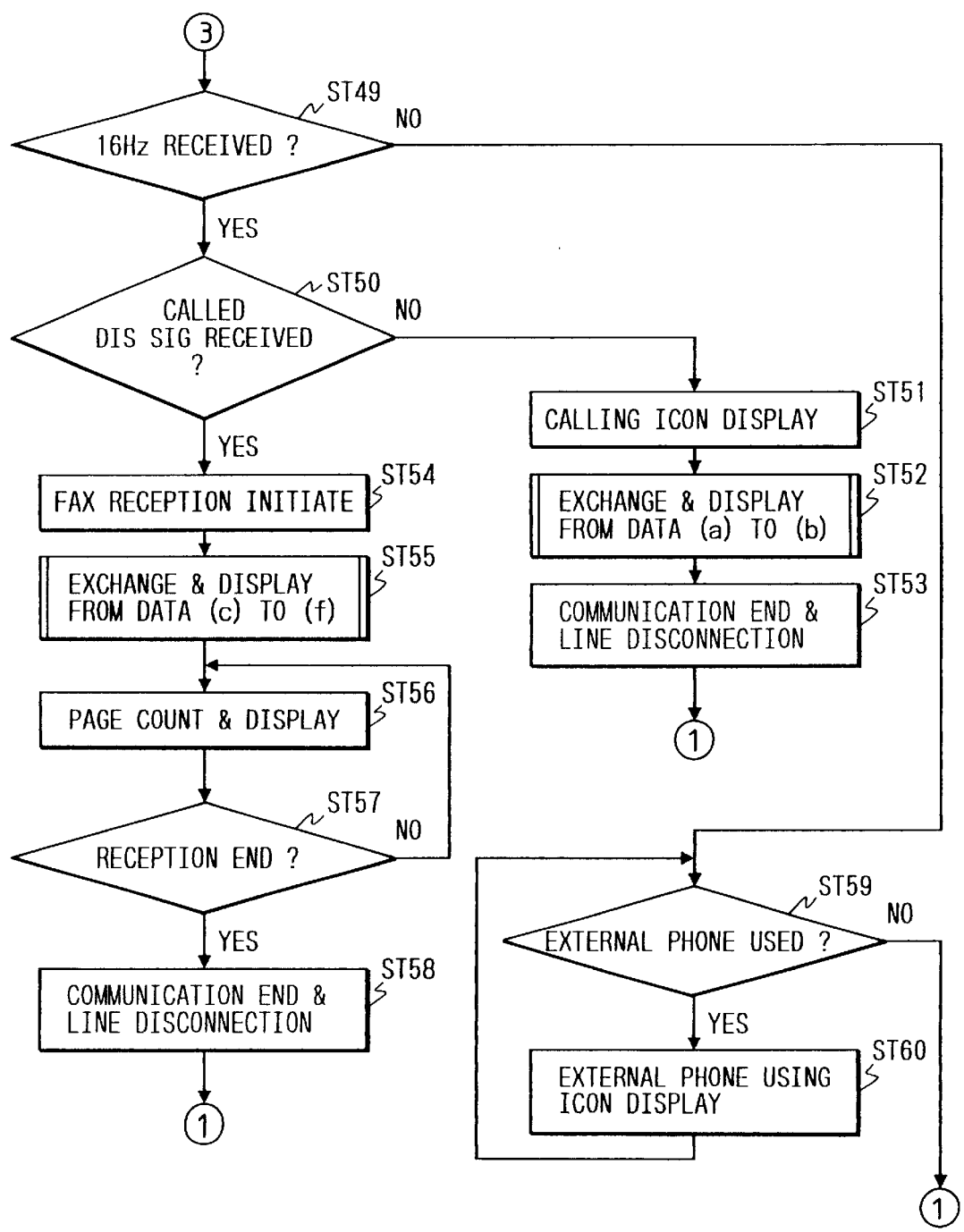

An operation of the information processing system of this embodiment will be explained in more detail, with reference to the flowcharts of FIGS. 6 to 8. FIG. 6 is a flowchart showing action from turning-on of an electric power to standing-by for various operations. FIGS. 7 and 8 are flowcharts showing action in the case a memory card is connected to the apparatus.

After the electric power is turned on, an input/output circuit is initialized in a step ST1. Next, the CPU 1 checks a memory card interface (abbreviated by IF hereinafter) to judge whether or nor the memory card is inserted, and sets a confirmation flag indicating the presence of the memory card in a step ST2. This check action will be described later in more detail together with insertion/extraction control of the memory card. However, from the explanation described simply here it will be understood that the CPU 1 operates differently depending on the presence of memory card.

It is checked whether or not the memory card is inserted in a step ST3. If the memory card is inserted, the CPU 1 proceeds to a card processing routine later described. If not, the CPU 1 executes the following procedure.

Figure 10:
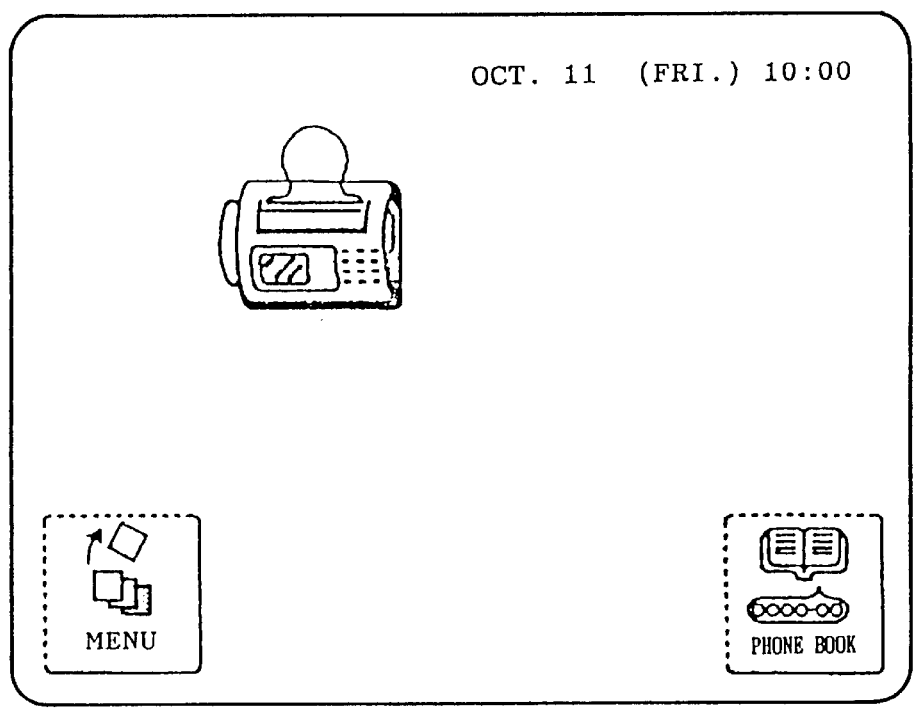
Figure 11:
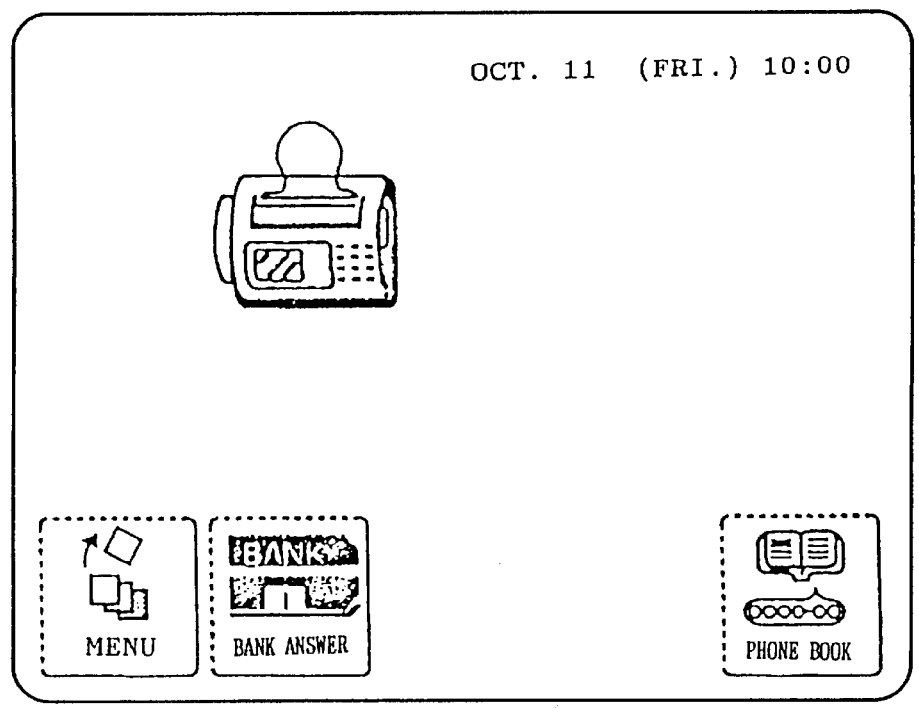
Figure 12:
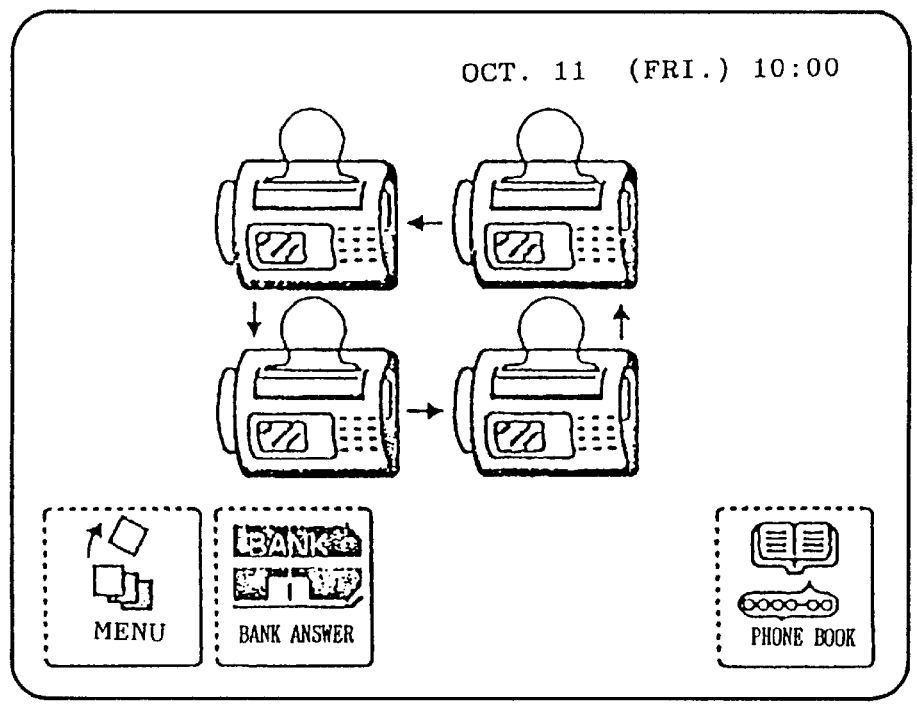

The CPU 1 initializes the content of VRAM 4 used for display on the LCD 2 in a step ST4. FIGS. 10 through 12 show initial screens displayed on the LCD 2 respectively, in which FIG. 10 shows an initial screen displayed on the LCD 2 when the memory card is not inserted into the apparatus while FIGS. 11 and 12 show initial screens displayed when the memory card is inserted.

To display the initial screen of FIG. 10, the LCD controller 3 transfers the left graphic data of FIG. 4(a) from the RPM 9 and displays it on the text plane screen #1 of the VRAM 4 as illustrated in FIG. 3 in a step ST5. The LCD controller 3 further transfers the right graphic data of FIG. 4(c) from the RPM 9 and displays it on the text plane screen #1 of the VRAM 4 in a step ST6 and, then, sums or composes these FIGS. 4(a) and 4(c) to display a composite image on the LCD 2.

In this case, it will be preferable to prepare a plurality of image plane screens to memorize the graphic data of FIGS. 4(a) and 4(c) into different screens. It is needless to say that there is no need to rewrite the content of the VRAM 4 in exchanging FIG. 4(a) for FIG. 4(b).

Next in a step ST7, the CPU 1 transfers function frames from the ROM 9 and composes them onto the image plane screen #1 in the VRAM 4 through the LCD controller 3. As shown in FIG. 10, the function frame is displayed by use of both a solid line and a dotted line. This will be effective to realize 3-dimensional display of function frames without specially using lines or rows exclusively for the display of function frames.

That is to say, in the conventional display system using a 2-dimensional screen, the way of realizing 3-dimensional display used to be as follows. Like a scenography, a near part is depicted by a thick line and a faraway part by a thin line. Expression of a thick line usually requires a bunch of dot rows disposed adjacent with each other. On the other hand, the way of expressing the function frame by a solid line and a dotted line in accordance with this embodiment can realize an adequate 3-dimensional display without requiring additional dot lows.

Furthermore, the display of a plurality of function frames, displayed close with each other as shown in FIG. 11, will be seen as if a dotted line of one function frame indicated a height of a solid line of next function frame.

Subsequently in a step ST8, the CPU 1 composes and displays function characters to be displayed in the function frame on the text plane screen #1 in the VRAM 4 through the LCD controller 3 and the 1st CG 5.

Thereafter the CPU 1 proceeds to a step ST 9 and checks a condition flag (not shown) to judge whether or not the condition of the apparatus is variously changed. Various changes means, for example, hook on, monitor on, manuscript set, call reception, and external phone usage. Hereinafter, a first mode is referred to as hook off and monitor on condition. Similarly, a second mode as manuscript set condition, a third mode as call reception condition, and a fourth mode as external phone usage condition.

The information processing system of this embodiment changes, at equal intervals, the display position of the apparatus appearance pattern as if it circulated, e.g. in a counterclockwise direction, on the LCD 2 as shown in FIG. 12.

Before going on to the explanation of each mode, the display of the LCD 2 will be more explained about the case where the condition of the apparatus is not changed. After detecting no physical condition change of the apparatus in steps ST9 and ST10, the CPU 1 continues monitoring condition change of the apparatus and increments a timer every constant time in a step ST11.

Hereinafter, this timer increment process will be explained in detail. If the CPU 1 judges in a step ST11 that a predetermined time has elapsed, the CPU 1 calculates the next display position of the apparatus appearance pattern on the basis of the present position displayed on the LCD 2, and memorizes it in the RAM 8 in a step ST12. Thereafter the CPU 1 erases the apparatus appearance patterns of FIGS. 4(a) and 4(b) in a step ST13, and transfers the apparatus appearance patterns of FIGS. 4(a) and 4(b) to the calculated next position and displays it on the same in a step ST14. Thus, one complete timer processing is finished. The processing of shifting and displaying the apparatus appearance graphic data will be described in detail later.

In this embodiment, the period of time for timer processing is set 2 seconds. In other words, during the waiting condition, the appearance graphic data displayed on the LCD 2 looks as if it moved around on the LCD 2 at regular intervals of 2 seconds.

It will be also preferable, instead of calculating the next display position in the steps ST12 to ST14, to memorize predetermined display positions to be shifted. Furthermore, it is needless to say that preparing three kinds of text plane screens for, e.g. characters, position fixed images, and position variable images in the VRAM 4 as shown in FIG. 3 will realize the similar display effect. Changing the display like an animation in this manner will not only make the display pleasant during the waiting (or stand-by) condition but let an operator acknowledge at a glance that the apparatus is operating in a normal condition.

Next, a case where the apparatus causes change will be explained below. If the CPU 1 detects in the steps ST9 and ST10 that the apparatus condition is changed, the procedure goes on to a condition change process routine shown in FIG. 7 in a step ST15.

Figure 13:
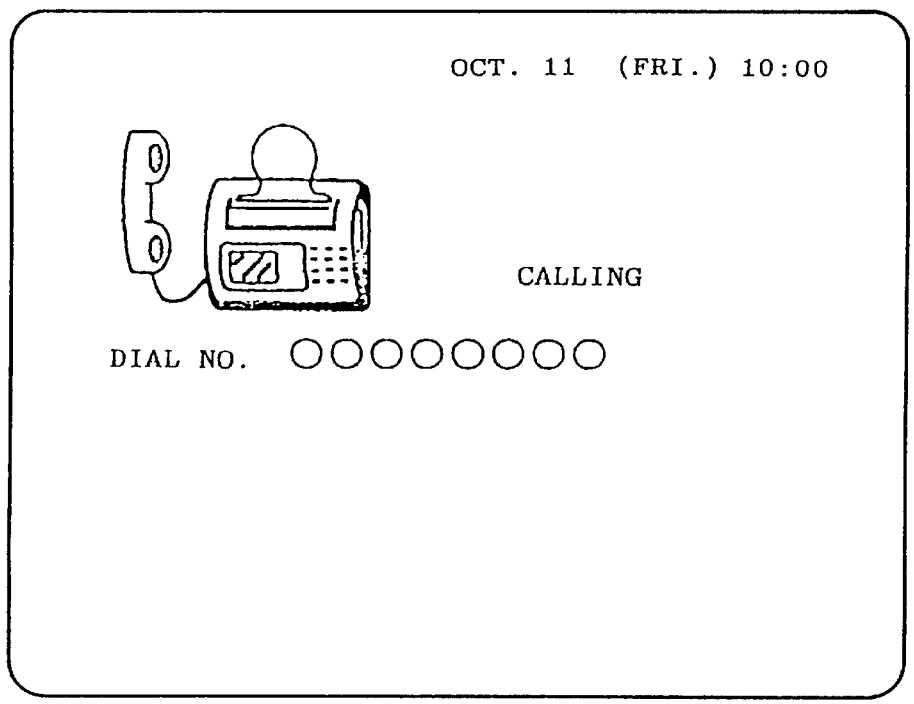
FIG. 13 is a view showing a screen displayed on the LCD when a handset is hooked off or a monitor button is depressed for telephone conversation.

Referring now to FIG. 7, this condition change process routine will be explained in detail. First of all, the first mode previously defined will be explained. FIG. 13 is a screen displayed on the LCD 2 when a handset is hooked off or a monitor button is depressed for telephone conversation.

If the hook off of the handset or the depression of the monitor button is detected in a step ST16, the CPU 1 exchanges the graphic data of FIG. 4(a) for that of FIG. 4(b) and displays it on the LCD 2 in a step ST17. Subsequently, a dial number inputted through the numerical keys 27 by an operator is displayed on the LCD 2 in a step ST18.

A screen displayed on the LCD 2 in this instance is composed in the following manner. As previously explained referring to FIG. 3, the graphic data displayed in the step ST17 is memorized in the image plane screen #1 in the VRAM 4. Meanwhile, the character data representing opponent phone number to be displayed in the step ST18 is memorized in the text plane screen. And, the LCD controller 3 composes or combines these text plane and image plane screens into one screen to be displayed on the LCD 2.

Figure 14:
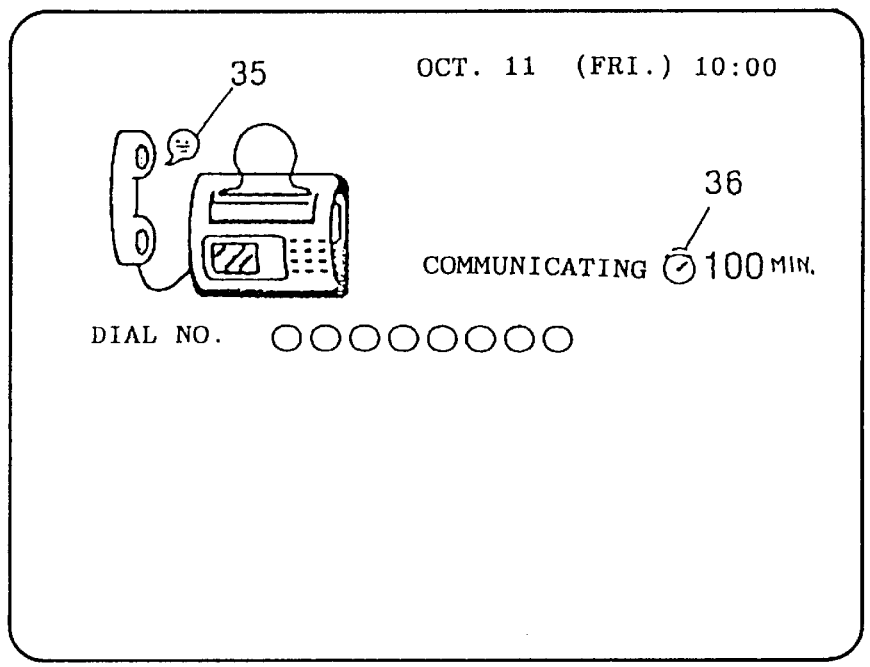
FIG. 14 is a view showing a screen displayed on the LCD when a response is returned from the opponent side in the TEL mode.

If a response is returned from the opponent side after the step ST18, the LCD 2 displays a screen shown in FIG. 14.

In FIG. 14, a reference numeral 35 indicates a response icon and a reference numeral 36 represents a communication icon. When a response is returned from the opponent after the step ST18, the CPU 1 displays the response icon 35 in a step ST19 and further displays the communication icon 36 together with communication time in a step ST20. In this embodiment, the response icon 35 and the communication icon 36 are already registered in the ROM 9 as character codes. Therefore the way of displaying these icons 35, 36 is different from that of the divided right and left graphic data. That is, the CPU 1 specifies the character code and then the first CG 5 outputs a corresponding bit pattern. Thereafter, thus obtained bit pattern is composed with the graphic data independently obtained by the LCD controller 3. This display is memorized in the text plane screen #1 of the VRAM 4.

As the response icon 35 and the communication icon 36 can be both handled as character codes, the LCD controller 3 can simply and speedily perform display operation by only designating the position of the LCD 2 where these character codes 35, 36 are displayed. Furthermore, it becomes possible to realize a unique display of operational mode change which looks as if the graphic data was altered, by only adding character codes without changing the graphic data.

If the conversation is finished, the CPU 1 responds it and commands the NCU 19 to disconnect the line in a step ST21, and further returns to the initial screens shown by FIGS. 10 to 12 for standing by.

Figure 15:
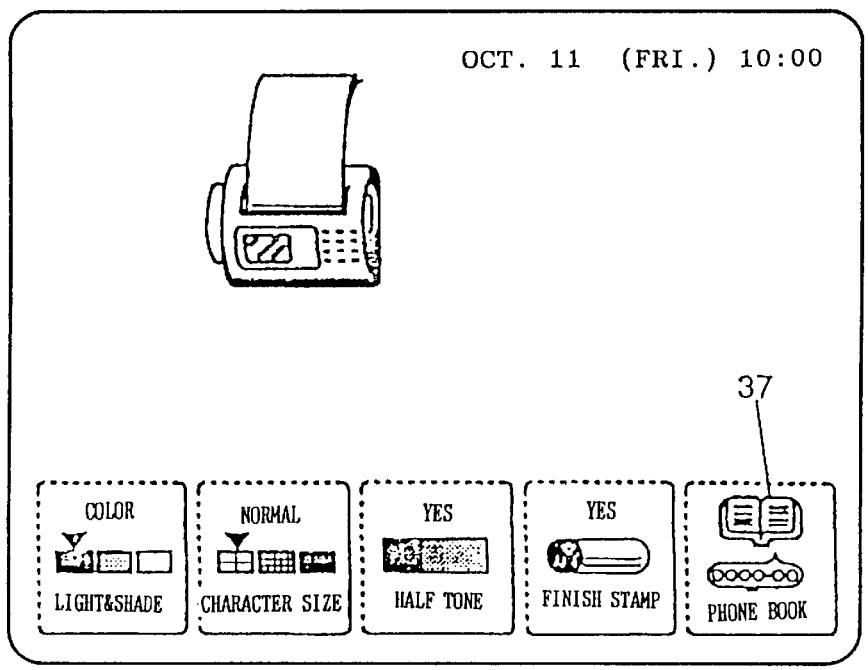
FIG. 15 is a view showing a screen displayed on the LCD in the case where a manuscript is set on the apparatus for FAX transmission or copy.

Next, the second mode will be explained. FIG. 15 shows a screen of the LCD 2 in the case where a manuscript is set on the apparatus for FAX transmission or copy during the stand-by condition (step ST9).

At the time when the manuscript just set on the apparatus, the CPU 1 cannot judge whether this manuscript is to be FAX transmitted or copied. Therefore, the CPU 1 displays all the functions necessary for FAX transmission and copy as shown in FIG. 15.

Referring now to FIG. 7, an operation in the second mode will be explained in detail.

It is checked in a step ST22 whether or not the manuscript is set for FAX transmission or copy. If the judgement is YES in the step ST22, the CPU 1 rewrites the graphic data memorized in the VRAM 4 from FIG. 4(c) to FIG. 4(d) and displays it on the LCD 2 in a step ST23. Then, after additionally displaying function frames in a step ST24, the CPU 1 rewrites the character to be displayed in this function frame in a step ST25.

The screen displayed on the LCD 2 is composed in the following manner. That is, as previously explained with reference to FIG. 3, the image data of the function frame (to be displayed in the step ST24) is memorized in the image plane screen #1 while the character data displayed in this function frame (to be displayed in the step ST25) is memorized in the text plane screen #1. Then, the LCD controller 3 composes these text plane and image plane screens into one screen to be displayed on the LCD 2. As the character data and the function frame are memorized in the different screens, the function frame can surround the character data even if there is no sufficient space (e.g. one character width) under the character data displayed. In other words, a display can be made easy to see without losing display space.

In FIG. 15, an electronic phone book icon 37 represents an electronic phone book, which is already registered in the ROM 9 as a character code. This display is memorized in the text plane screen #1 in the VRAM 4. Using such patterns in function display will enable users to easily understand the content of display in the selection of functions of apparatus. This electronic phone book icon 37 is equivalent to two characters; therefore it is twice as large as one character. It is needless to say that the icon can be made large to be equivalent to three characters or more. In the same manner, other graphic data displayed in the function frames are all registered in the ROM 9 as character codes.

Accordingly, it becomes possible for the CPU 1 to handle each of these graphic data memorized in the ROM 9 as one of character data. Combination of these character codes will thus realize a quick display of a large pattern, which used to be displayed by the image data.

In this case, to realize above-described pattern display consisting of a plurality of characters, dot patterns are determined in the following manner. At least one-line dot blank is provided between adjacent two, upper and lower, lines so as to prevent characters displayed in these two lines from contacting with each other in an up-and-down direction. On the contrary, no dot blank is provided between two, right and left, rows because there is a necessity of connecting a plurality of characters continuously in a right-and-left direction to form a single large pattern.

Thereafter, the CPU 1 monitors in a step ST26 whether or not the copy button, one of operation keys 28, is depressed.

Figure 16:
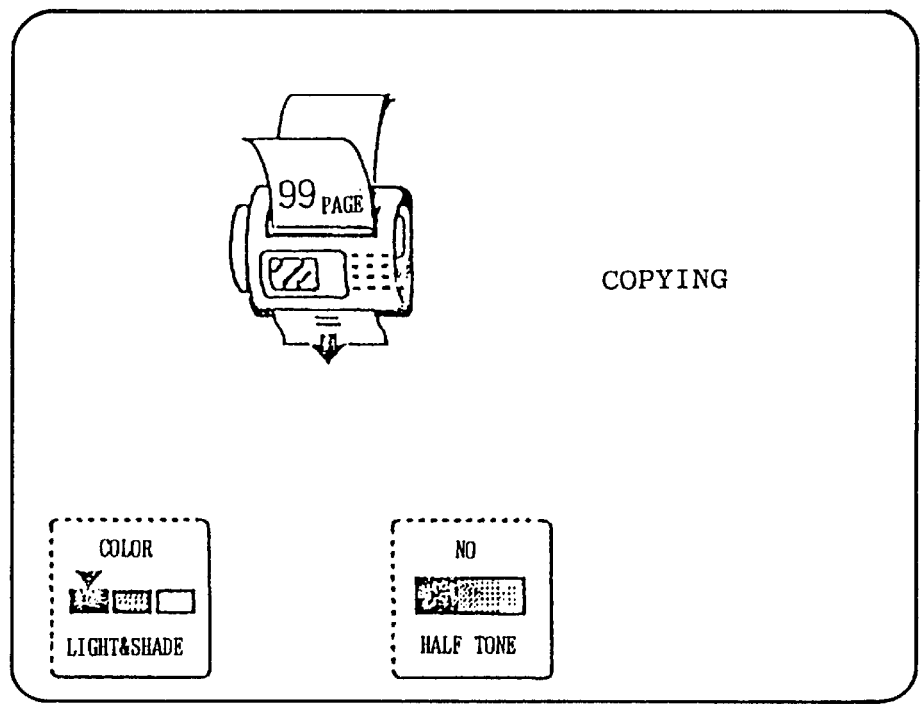
FIG. 16 is a view showing a screen displayed on the LCD during the copy action.

FIG. 16 shows a screen displayed on the LCD 2 during the copy action.

If the copy button is depressed, the CPU 1 proceeds to a step ST27 and allows the apparatus to initiate a copy action under the condition determined by the functions shown in FIG. 15. Furthermore, the CPU 1 rewrites the graphic data memorized in the VRAM 4 from FIG. 4(d) to 4(e) and displays it on the LCD 2 in a step ST28. The apparatus appearance graphic data displayed on the LCD 2 is composed by the LCD controller 3 and memorized in the image plane screen #1 of the VRAM 4 as previously explained referring to FIG. 3.

Thereafter in a step ST29, the CPU 1 not only displays an indication of "COPYING" near the apparatus appearance graphic data but activates a counter to count the number of copied pages and indicate the counted number on the graphic data displayed on the LCD 2 so as to superimpose on the manuscript being presently fed. Such a display enables an operator to immediately grasp the presently selected operation mode and its progress. The character data representing "PAGE" displayed on the LCD 2 is composed by the LCD controller 3 and memorized in the text plane screen #1 of the VRAM 4 as previously explained referring to FIG. 3.

Subsequently in a step ST30, all the unnecessary function displays having no relation with copy action are erased from the LCD 2. This will be welcome by a person who is not familiar with the operation of this apparatus.

Thereafter, if the CPU 1 detects in a step ST31 that all the copy action is finished, the CPU 1 returns to the initial screens shown by FIGS. 10 to 12 for standing-by.

By the way, it is needless to say that, even after the mode has been changed by the function switches F1 through F4 explained below, the copy action is performed in accordance with thus changed mode.

Next, the display of LCD 2 and processing action will be explained about a case where other operations are performed after the manuscript is set.

First of all, the mode change by use of the function switches F1 through F4 will be explained. The function switch F1 corresponds to light and shade, F2 to character size, F3 to half tone, F4 to finish stamp, and F5 to electronic phone book, respectively.

As explained in the foregoing description, the screen of FIG. 15 is displayed when the manuscript is set. If the CPU 1 detects in a step ST32 that any one of function switches F1 through F4 is depressed, the CPU 1 responds this to adjust the specified or corresponding function and rewrites the display content on the LCD 2 in a step ST33.

Figure 17:
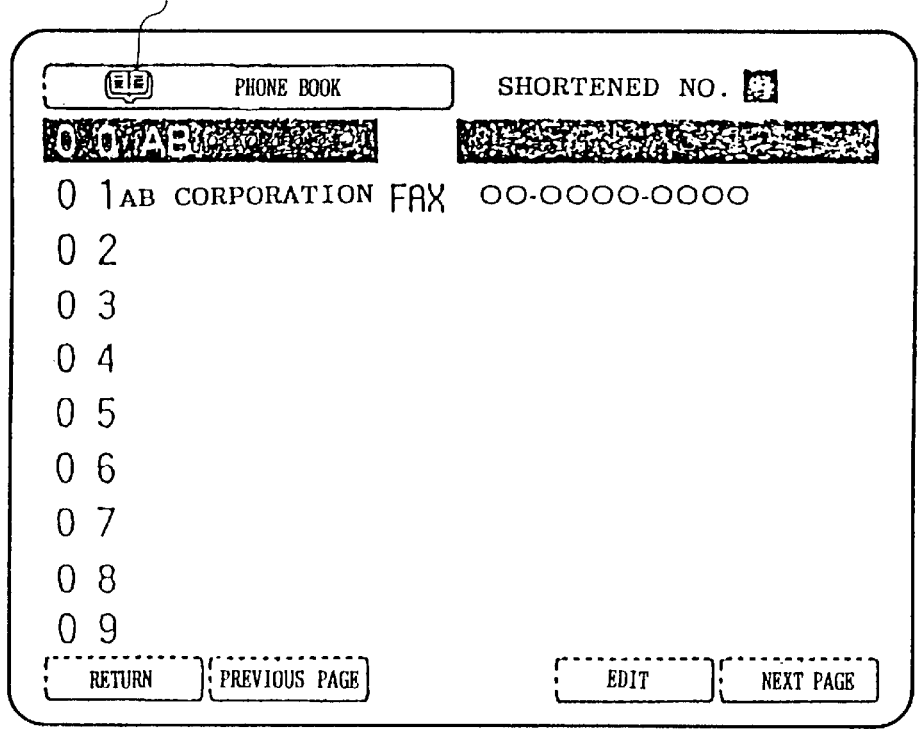
FIG. 17 is a view showing a screen displayed on the LCD when the electronic phone book is opened.
Figure 18:
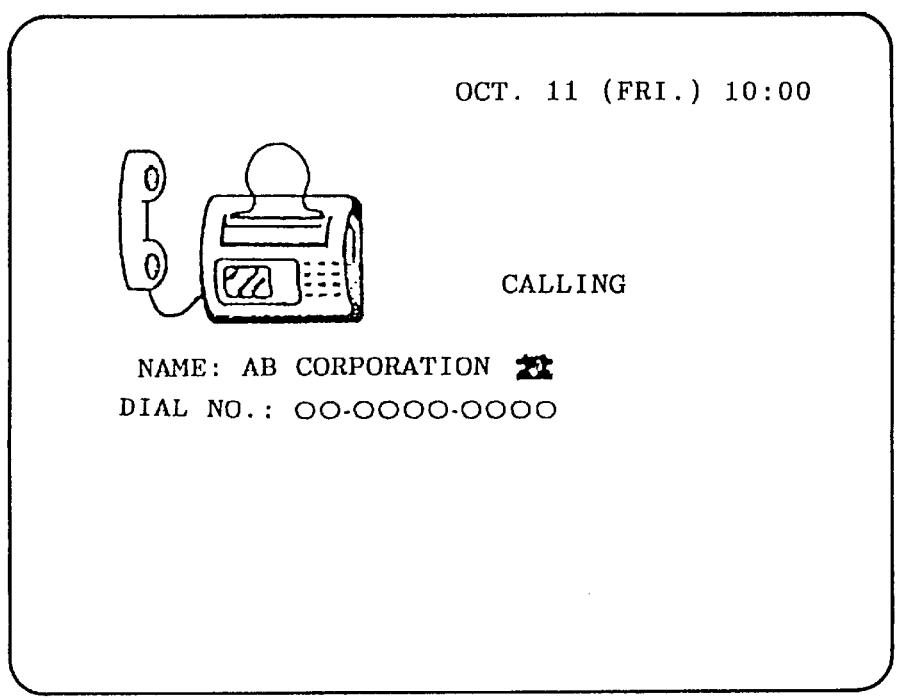
FIG. 18 is a view showing a screen displayed on the LCD when an opponent phone number is now being called through the electronic phone book.
Figure 19:
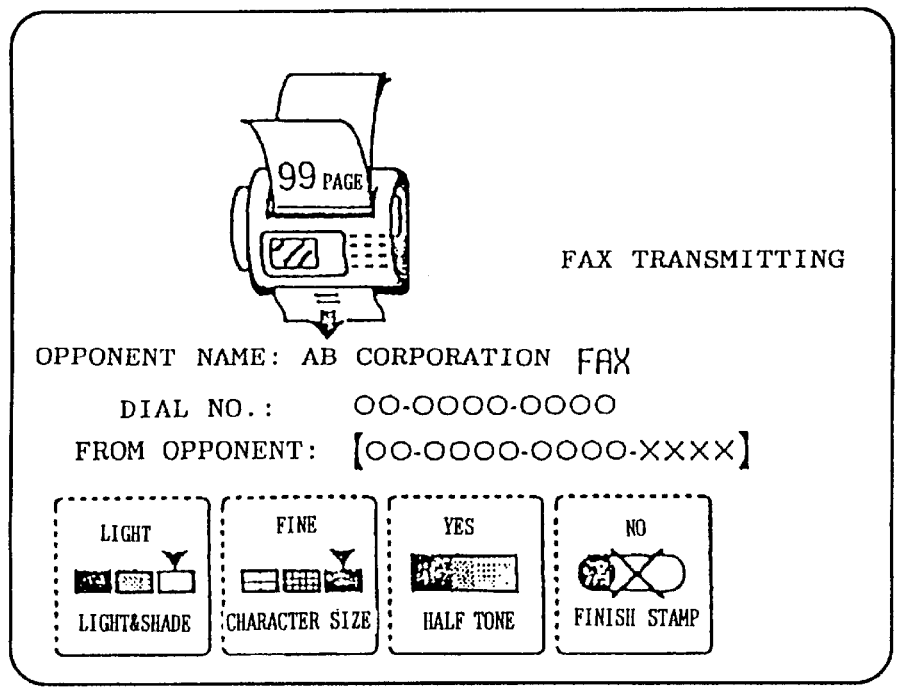
FIG. 19 is a view showing a screen displayed on the LCD when the FAX transmission is progressing through the electronic phone book mode.

Next explained will be a case where the FAX transmission is executed after the manuscript has been set. Described first of all with reference to FIGS. 17 through 19 will be the way of display on the LCD 2 when the FAX transmission is performed by selecting an opponent phone number from the list memorized in the electronic phone book. FIG. 17 shows a screen displayed on the LCD 2 when the electronic phone book is opened, FIG. 18 shows a screen displayed on the LCD 2 when an opponent phone number is now being called through the electronic phone book, and FIG. 19 shows a screen displayed on the LCD 2 when the FAX transmission is progressing through the electronic phone book mode.

If the function switch F5 is depressed after the manuscript is set in a step ST34, the display on the LCD 2 is switched from the FIG. 15 to FIG. 17 in a step ST35. As can be seen from FIGS. 15 and 17, layout of graphic data (electronic phone book icon 37) and character date ("PHONE BOOK") is different between FIGS. 15 and 17. Namely, the electronic phone book icon 37 and the character "PHONE BOOK" are arrayed in an up-and-down direction in the stand-by condition (FIG. 15) so that they can be widely displayed in the function frame. Meanwhile, the electronic phone book icon 37 and the character "PHONE BOOK" are arrayed in an right-and-left direction in FIG. 17 so that sufficient display space can be used for the content of the electronic phone book (phone numbers, opponent names, - - - ). As is previously described, the electronic phone book icon 37 is already registered in the ROM 9 as a character code. Therefore, the electronic phone book icon 37 is dealt with as one of character code. This means that the LCD controller 3 can easily and quickly accomplish the layout change from vertical direction to lateral direction by merely designating the display position of these character codes.

Next, in a step ST36, an opponent phone number is selected from the list memorized in the electronic phone book (FIG. 17) by means of the scroll button 26 or numerical keys 27. Subsequently in a step ST37, the CPU 1 automatically dials this number and displays an information explaining opponent name and phone number together with an indication of "CALLING" as shown in FIG. 18.

Thereafter, if the opponent side returns a response, the CPU 1 initiates FAX transmission in a step ST38. Then an ID, sent from the opponent side, is displayed on the LCD 2 in a step ST39. Then, the graphic data is changed from FIG. 4(d) to FIG. 4(e) in a step ST40, and unnecessary function displays of electronic phone book are erased in a step ST41. Subsequently, the counter is activated to count FAX transmitted pages and displays the number of transmitted pages in a step ST42.

Although the number (i.e. 99 in FIG. 19) of the counter is continuously incremented in accordance with the progress of FAX transmission, the character data "PAGE" (disposed at right side of 99 in FIG. 19) needs not be changed. Therefore, the character data "PAGE" is already registered on the graphic data 4(e) in order to speed up the processing speed of counter. If all the FAX transmission procedure is finished, the CPU 1 detects it in a step ST43 and returns to the initial screens of FIGS. 10 to 12 for standing-by.

Next, the display operation of the LCD 2 will be explained about a case where an opponent phone number is directly inputted through the numerical keys 27. In such a case, the FAX transmission is performed by hooking off the handset or depressing the monitor button after setting a manuscript.

Figure 20:
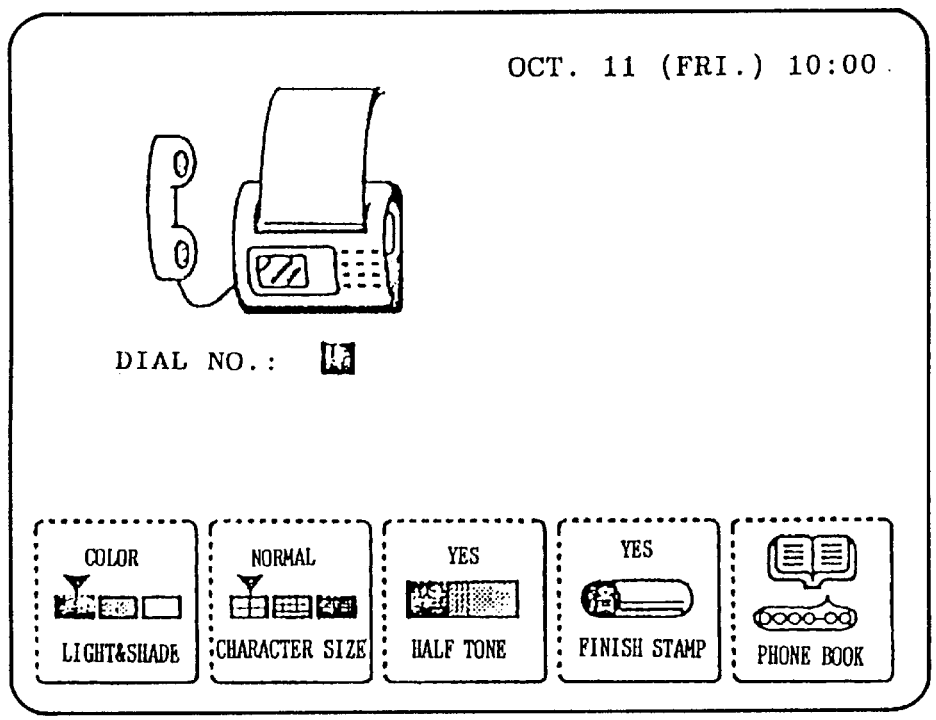
FIG. 20 is a view showing a screen on the LCD when the handset is hooked off after the manuscript has been set.

FIG. 20 shows a screen on the LCD 2 when the handset is hooked off after the manuscript has been set. Furthermore, FIG. 21 shows a screen on the LCD 2 when the monitor button is depressed after the manuscript has been set.

Figure 21:
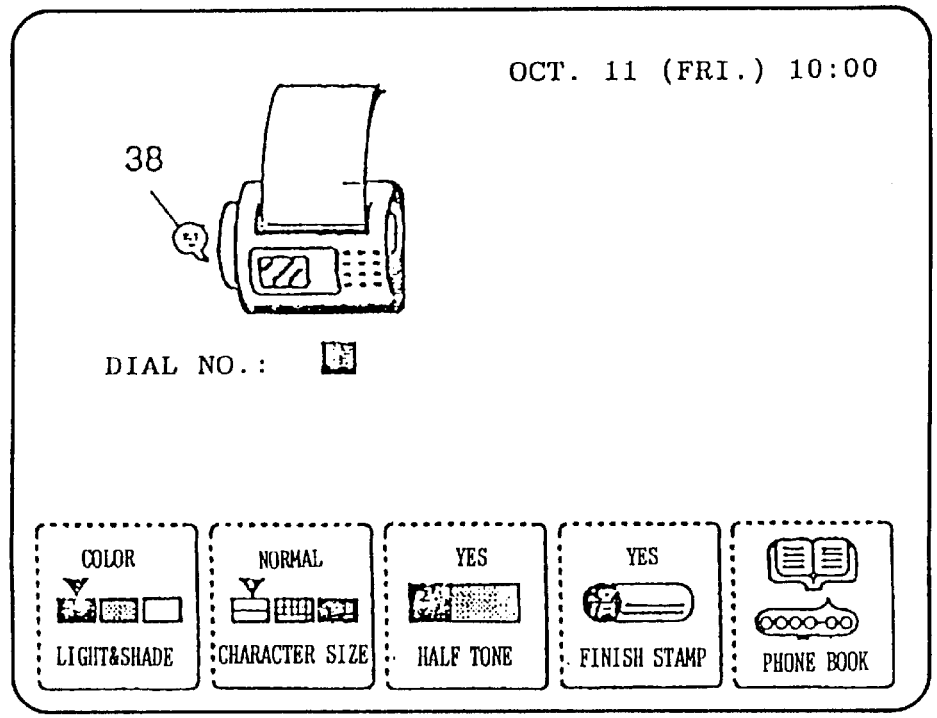
FIG. 21 is a view showing a screen on the LCD when the monitor button is depressed after the manuscript has been set.

In FIG. 21, a dial tone icon 38 represents the detection of dial tone. If, in a step ST44, a user hooks off the handset for FAX transmission after setting a manuscript, the CPU 1 rewrites the graphic data from FIG. 4(a) to FIG. 4(b) and displays it on the LCD 2 in a step ST45.

After the mode is set through previously described function switches F1 through F4 and the handset is hooked off for FAX transmission, the CPU 1 displays a character code "DIAL" which encourages a user to input a phone number, and flashes a cursor.

Thereafter, if an opponent phone number is inputted through the numerical keys 27, the CPU 1 displays this inputted phone number on the LCD 2 in a step ST46. By the way, it is needless to say that the FAX transmission can be performed after the user once talked with a person on the other end of the line.

Moreover, if in a step ST47 a user depresses the monitor button instead of hooking off the handset, the CPU 1 additionally displays the dial tone icon 38 on the LCD 2 in a step ST48 together with the character code "DIAL" which encourages a user to input a phone number, and flashes a cursor. Thereafter, the same procedure as in the hook-off mode is carried out. That is, when the opponent phone number is inputted through the numerical keys 27, the CPU 1 displays this inputted phone number on the LCD 2 in the step ST46. If the opponent side returns a response, the display on the LCD 2 is changed to FIG. 22 and FAX transmission is initiated. Thereafter, the CPU 1 executes the steps ST38 through ST43 in the same manner as in the electronic phone book mode. When all the FAX transmission is finished, the CPU 1 detects it in the step ST43 and returns to the initial screens of FIGS. 10 to 12.

Figure 23:
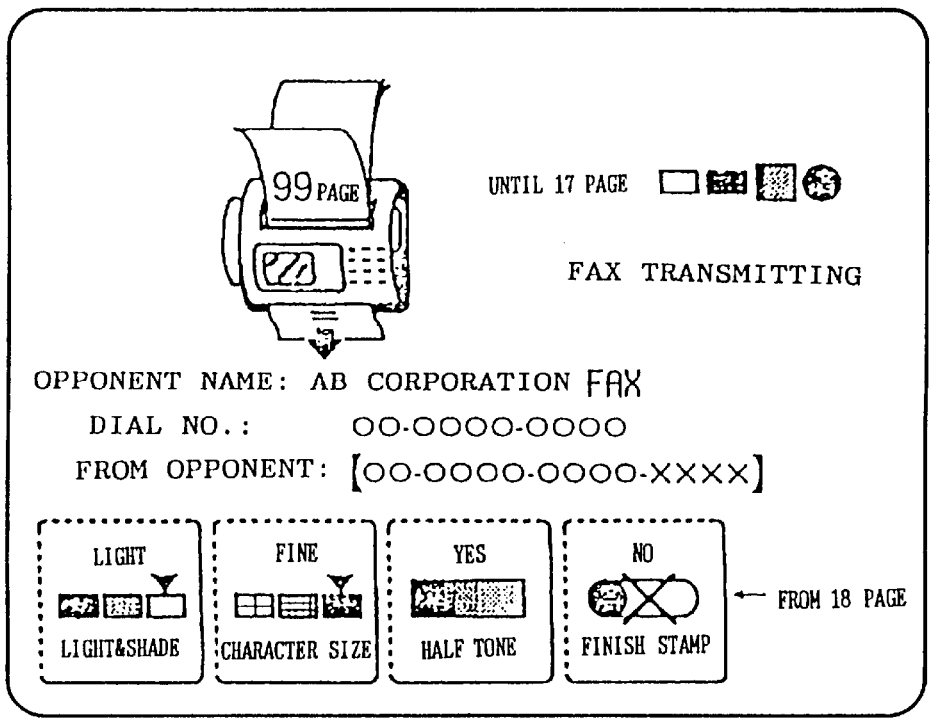
FIG. 23 is a view showing a screen on the LCD when the transmission mode is changed during the FAX transmission.

If the FAX transmission mode is changed during its transmission operation, the LCD 2 displays a screen of FIG. 23. Then, if any one of function switches F1 through F3 is depressed, this function change setting becomes effective from the next manuscript to be transmitted. Meanwhile, if the function switch F4 is depressed, this function change setting immediately becomes effective to a presently transmitting manuscript. This is because the F4 function (i.e. finish stamp) is initiated after one complete transmission of a manuscript is finished; while the F1~F3 functions must transmit their information prior to a manuscript. Thus, from the display of FIG. 23, an operator can easily know about from which page the transmission mode is changed.

Figure 22:
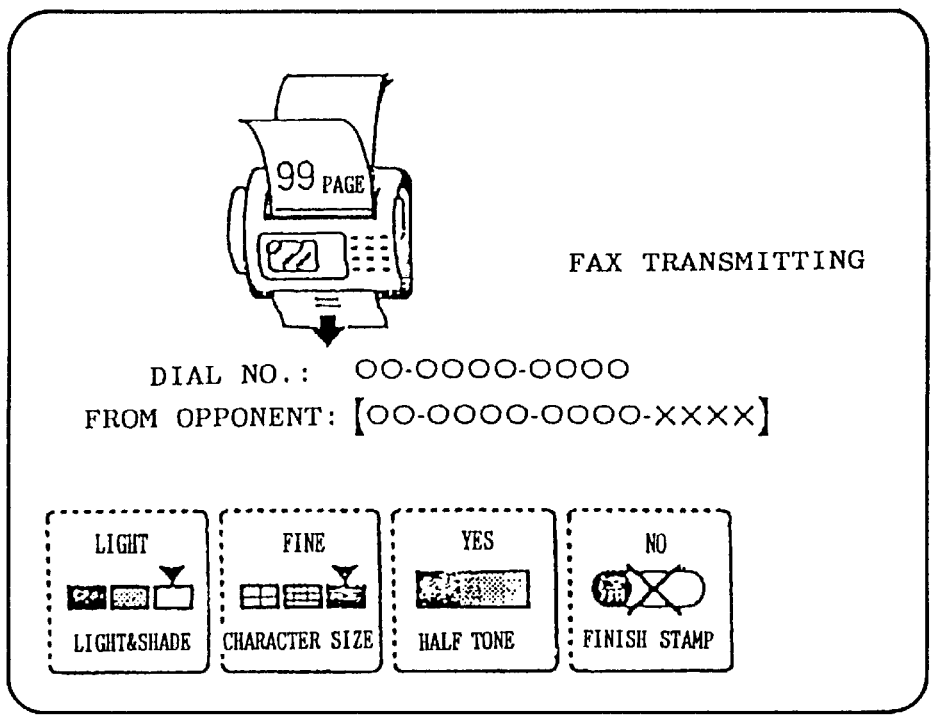
FIG. 22 is a view showing a screen on the LCD when the opponent side returns a response in the FAX transmission.

By the way, in the case where FAX transmission is performed by directly inputting the opponent phone number through the numerical keys 27, the LCD 2 will display the screen of FIG. 22. Because an opponent information is not available, although it is available in the electronic phone book mode.

Next, the third mode will be explained. First explained will be a case where a telephone call is received during the stand-by condition of FIGS. 10 to 12.

Figure 24:
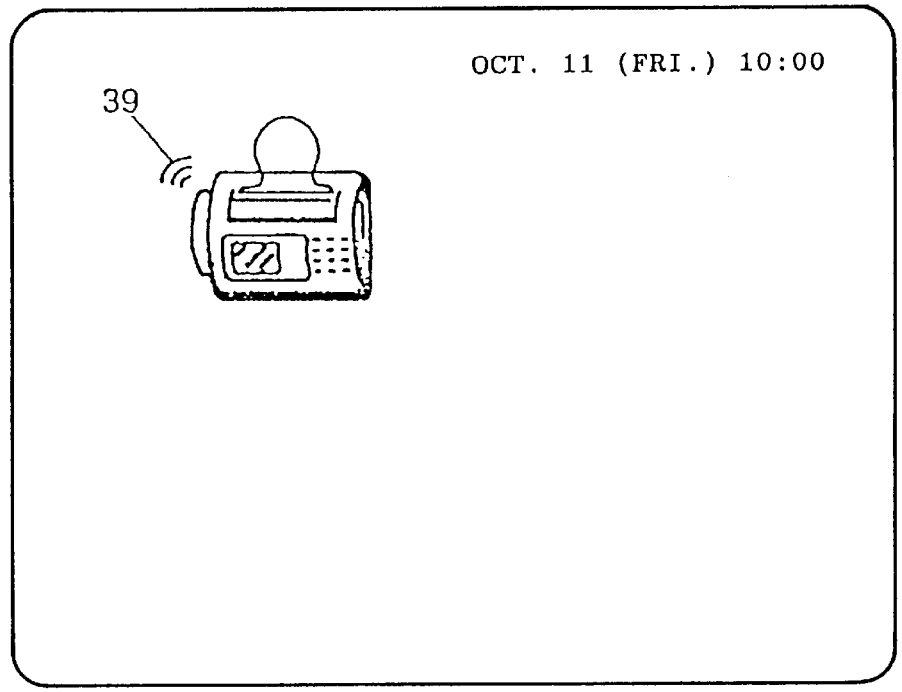
FIG. 24 is a view showing a screen on the LCD when a call is received during the stand-by condition.

If a telephone call is received, the LCD 2 changes its display from the initial screen to a screen of FIG. 24. In FIG. 24, a calling icon 39 indicates that a call arrival signal is detected.

When received a call, the NCU 19 receives a call arrival signal of 16 Hz in a step ST49. As a called discrimination signal, which is received in case of FAX mode, is not received in this telephone call in a step ST50, the CPU 1 additionally displays the calling icon 39 on the LCD 2 in a step ST51. In this embodiment the calling icon 39 is already registered in the ROM 9 as a character code; therefore this display is memorized in the text plane screen #1 of the VRAM 4.

Figure 25:
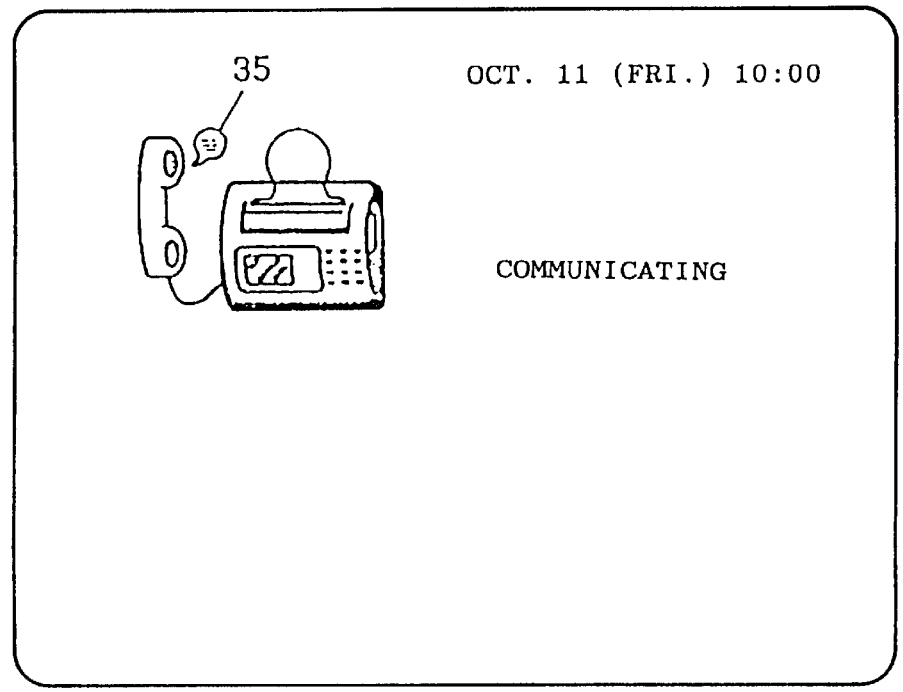
FIG. 25 is a view showing a screen displayed on the LCD when an user hooks off the handset in response to a call.

FIG. 25 shows a screen displayed on the LCD 2 when an user hooks off the handset in response to this call.

When the user hooks off the handset, the CPU 1 rewrites the graphic data from FIG. 4(a) to FIG. 4(b) and additionally displays the response icon 35 in a step ST52. In this embodiment the response icon 35 is already registered in the CPU 9 as a character code, and this display is memorized in the text plane screen #1 of the VRAM 4. On the other hand, the graphic data rewritten in the step ST52 is memorized in the image plane screen of the VRAM 4.

Thereafter, if the communication is finished, the CPU 1 notifies the NCU 19 of an interruption of the line in a step ST53, and returns to the initial screens of FIGS. 10 to 12.

Figure 26:
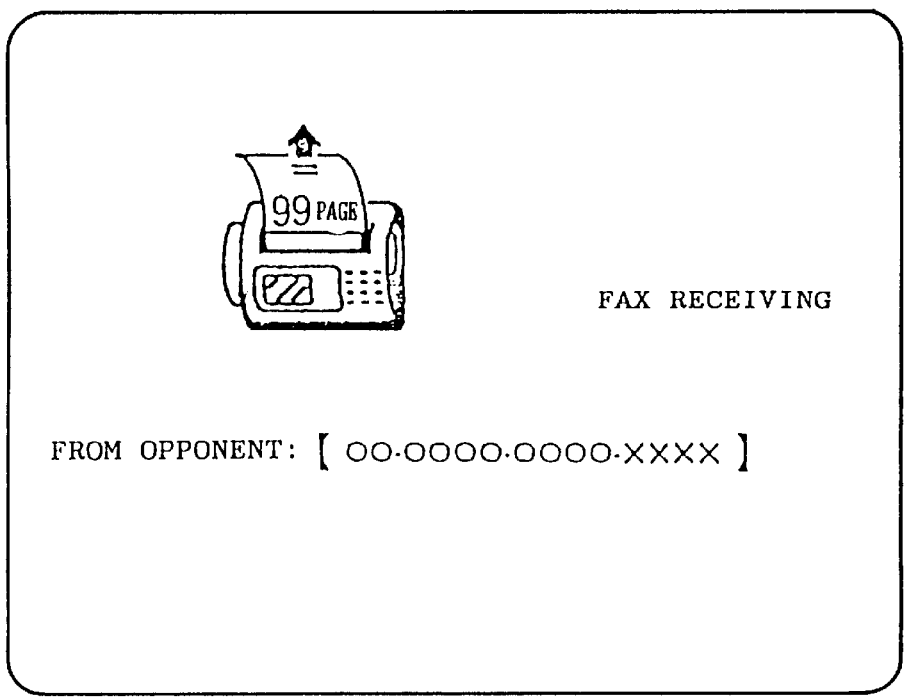
FIG. 26 is a view showing a screen displayed on the LCD when the FAX transmission is received.

Next explained will be a case where FAX transmission is received during the stand-by condition. FIG. 26 shows a screen displayed on the LCD 2 when the FAX transmission is received.

When received the FAX transmission, the NCU 19 receives the call arrival signal of 16 Hz in the step ST49 in the same manner as in the telephone call. If the apparatus is set to FAX receiving mode or automatic receiving mode, this 16 Hz arrival signal will automatically hook off the phone and detects the called discrimination signal. If the called discrimination signal is received, the CPU 1 judges it as FAX transmission. If not, the CPU 1 recognizes it as telephone call.

After detecting the called discrimination signal in the step ST50, the CPU 1 initiates the FAX reception in a step ST54. Then, the CPU 1 rewrites the graphic data from FIGS. 4(c) to FIG. 4(f) and displays it on the LCD 2 in a step ST55. Also, the counter is activated to count pages received and an indication of "FAX RECEIVING" is displayed at right side of the graphic data representing appearance of the apparatus. And, the number of received pages (e.g. 99 in an example of FIG. 26) is displayed on a recording paper portion of the graphic data. Furthermore, the CPU 1 receives the ID information being sent from the opponent side composes it on this display screen in a step ST56.

In this case, the page number, the character code "FAX RECEIVING", and the ID information are composed and memorized onto the text plane screen of the VRAM 4 by the LCD controller 3 as previously explained in detail with reference to FIG. 3. Meanwhile, the graphic data representing an appearance of apparatus is composed and memorized onto the image plane screen of the VRAM 4 by the LCD controller 3.

Thereafter, if the CPU 1 detects in a step ST57 that the reception is finished, the CPU 1 notifies the NCU 19 that the line is interrupted in a step ST58 and then returns to the initial screens of FIGS. 10 to 12 for standing by.

Figure 27:
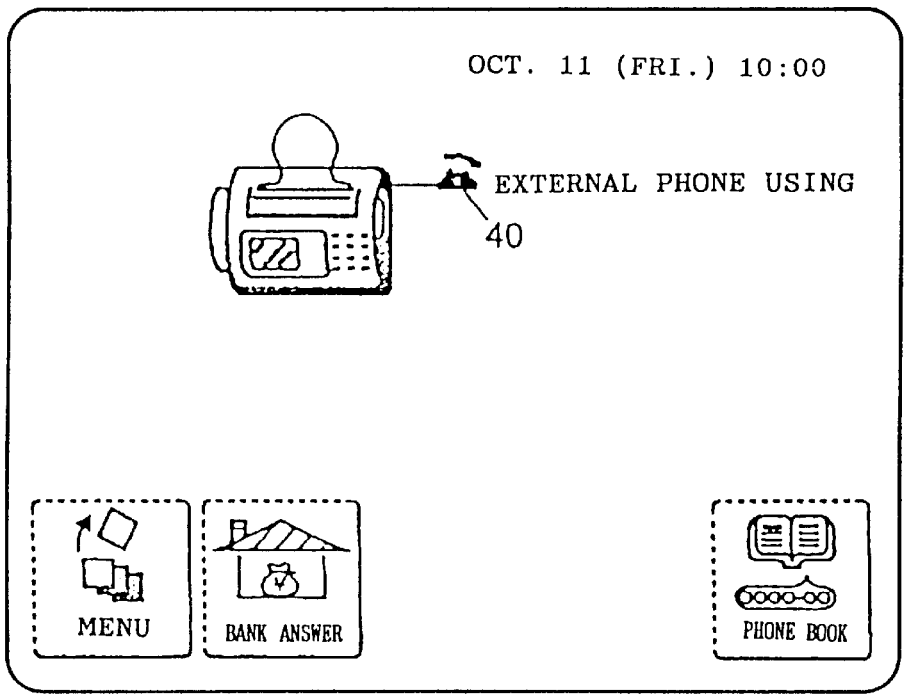
FIG. 27 is a view showing a screen displayed on the LCD when the external phone is used.

Next, the fourth mode will be explained. First explained will be a case where an external phone is used during the stand-by condition. FIG. 27 shows a screen displayed on the LCD 2 when the external phone is used.

In FIG. 27, an external phone using icon 40 indicates that the external phone is now used. If the usage of the external phone is detected in a step ST59, the CPU 1 detects it and additionally displays the external phone using icon 40 together with a character code "EXTERNAL PHONE USING" in a step ST60. In this embodiment, the external phone using icon 40 is already registered in the ROM 9 as a character code and is memorized in the text plane screen of the VRAM 4.

Though these character code "EXTERNAL PHONE USING" and the external phone using icon 40 are both character codes, combining them will realize a unique display as if the graphic image was used. Furthermore, if there is no sufficient display space, usage of the external phone using icon 40 only will be acceptable to notify users of the present operating mode. Furthermore, the character code "EXTERNAL PHONE USING" is memorized in the text plane screen #1 as explained in detail with reference to FIG. 3.

Figure 28:
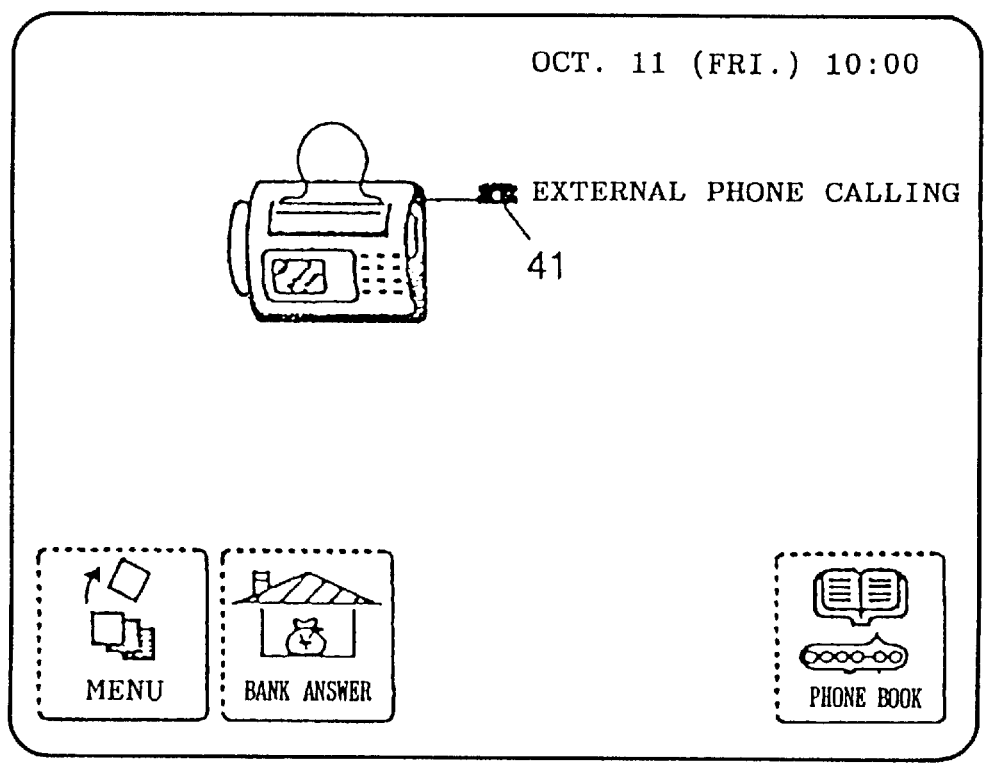
FIG. 28 is a view showing a screen displayed on the LCD when the external phone is called.

FIG. 28 shows a screen displayed on the LCD 2 when the external phone is called. In FIG. 28, an external phone calling icon 41 indicates that the external phone is called. When the external phone is called, the CPU 1 displays the external phone calling icon 41 together with a character code "EXTERNAL PHONE CALLING" as shown in FIG. 28.

As previously described, the external phone calling icon 41 and the external phone using icon 40 can be both handled as character codes. If these icons 40, 41 are alternately displayed, the display of the LCD 2 will look like an animation.

By the way, if the F1 switch, corresponding to the menu mode, is depressed during the stand-by condition, the LCD 2 displays a main menu containing a number of actions, e.g. electronic phone book register, user register including modification/registration of ID information, list print, execution of poling reception, transfer to card program etc.

If the F5 switch, corresponding to the electronic phone mode, is depressed, the list in the electronic phone book is displayed.

4. Graphic Data Transfer/Display Processing

Figure 9:
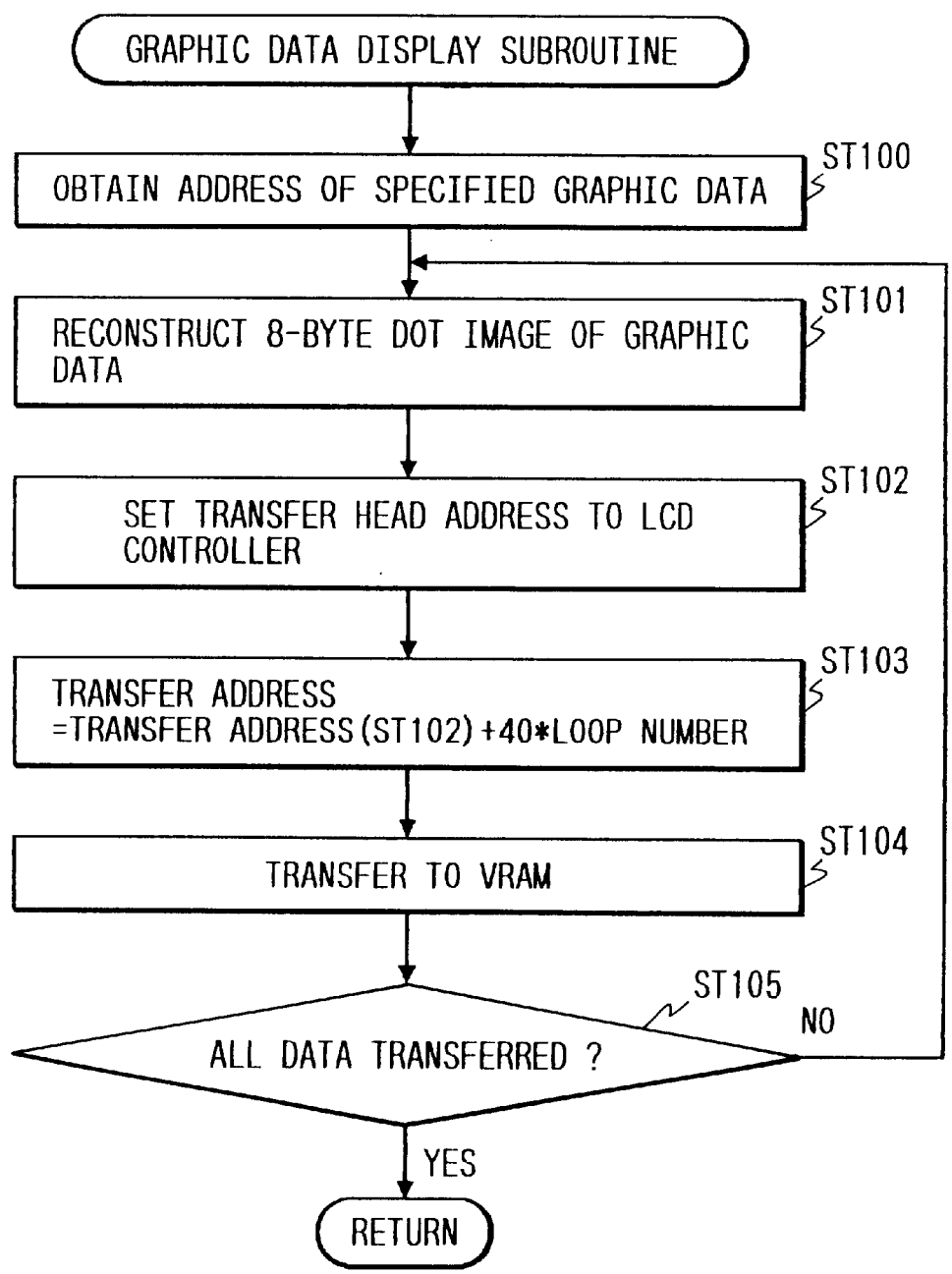
FIG. 9 is a flowchart showing the transfer/display processing of graphic data.

Hereinafter, transfer/display processing of graphic data to the LCD 2 and processing of memory card will be explained in detail. FIG. 9 is a subroutine showing the transfer/display processing of graphic data, which corresponds to steps ST5, ST6, ST14, ST17, ST23, ST28, ST40, ST45, ST52 and ST55.

Referring now to FIG. 9, the transfer/display processing of the graphic data representing the appearance of the apparatus will be explained in detail in accordance with the present invention. Let's suppose that FIG. 4(a) is displayed as a graphic data.

If the CPU 1 specifies FIG. 4(a), the LCD controller 3 obtains an address storing FIG. 4(a) from ROM 9 in a step ST100. The ROM 9 basically consists of a data-address memory portion and a compressed data memory portion. The data-address memory portion memorizes The graphic data FIGS. 4(a) through 4(f), respectively representing an appearance of the apparatus, are compressed and stored in predetermined addresses in the ROM 9. The data-address memory portion memorizes the relationship between each compressed graphic data and its address in the ROM 9, while the compressed data memory portion memorizes the compressed graphic data themselves.

Next in a step ST101, the CPU 1 reconstructs the dot image of 8 bytes to be displayed on the LCD 2 on the basis of the data corresponding to the compressed graphic data of FIG. 4(a), which corresponding to the address obtained in the step ST100.

Then in a step ST102, the CPU 1 sets the LCD controller 3 a head address in the VRAM 4 to which the reconstructed dot image is transferred. In more detail, the head address indicates the position of the head data of FIG. 4(a) on the LCD 2.

As the graphic data is transmitted by a data length of 8 bytes, it is necessary in this embodiment to specify a position of the next 8-byte data. To determine the address to which the 8-byte data is transferred, the following equation is used in a step ST103.

Actual Address=Address of ST102+40*Loop Number

Wherein, the loop number (an integer) is 0 in the first loop and is incremented by 1 as the loop is renewed.

Thereafter, the specified 8-byte graphic data is transferred to the VRAM 4, i.e. to thus calculated address, in a step ST104. Then, the data transfer processing of steps ST101 through ST104 is continuously repeated until all the data representing FIG. 4(a) is completely transferred into the VRAM 4. If the CPU 1 detects in a step ST105 that all the transfer processing is finished, the CPU 1 returns to each step of FIGS. 6 to 8.

Although a method of circulating the graphic data to realize an animation-like display is previously described, it can be realized by transferring while data. That is, the presently displayed graphic data can be erased by superimposing with the white data.

5. Memory Card Processing

Figure 29:
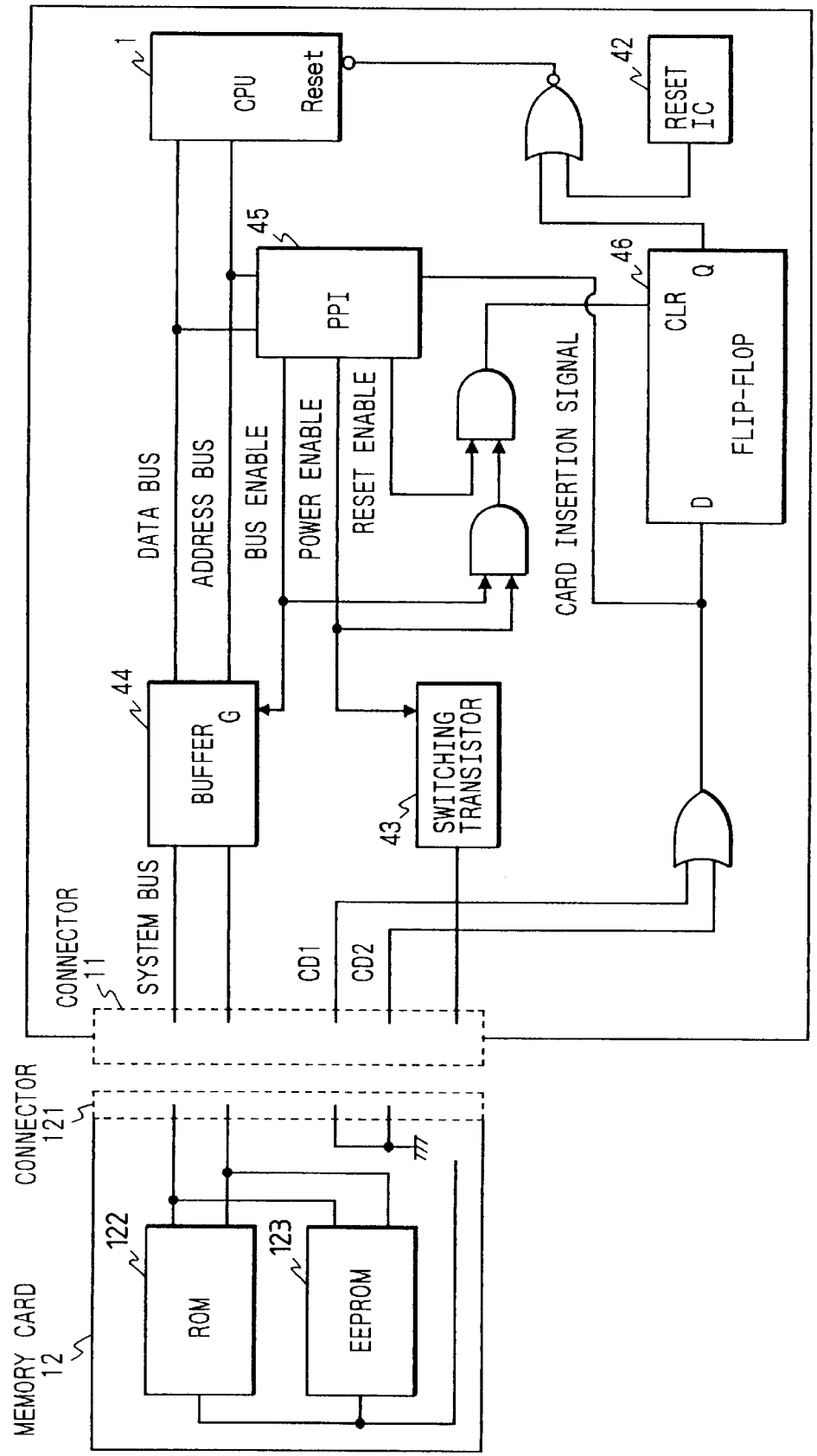
FIG. 29 is a schematic block diagram showing insertion/extraction control of the memory card in the information processing system in accordance with this embodiment.

FIG. 29 is a schematic block diagram showing insertion/extraction control of the memory card in the information processing system in accordance with the present invention.

In FIG. 29, a reference numeral 42 represents a reset IC which resets the CPU 1 when the memory card is pulled out of a connector 11. A switching transistor 43 supplies electric power to the memory card 12. A buffer 44 connects the memory card 12 and the CPU 1 by bus. A reference numeral 45 represents a parallel peripheral interface (hereinafter abbreviated by PPI). This PPI 45 inputs an address bus signal and a data bus signal from the bus between the CPU 1 and the memory card 12. The PPI 45 further inputs a card insertion signal in order to check the presence of the memory card 12. This card insertion signal is produced by an OR circuit which inputs check digit (abbreviated by CD)1 and CD2 provided both ends of the card pins.

The PPI 45 outputs a power enable signal which allows the switching transistor 43 to supply electric power to the memory card 12, and also outputs a bus enable signal to a gate of the buffer 44 so as to allow bus connection between the CPU 1 and the memory card 12. A flip-flop 46 inputs an AND result of three, i.e. power enable, bus enable, and reset enable, signals. And, the flip-flop 46 outputs the card insertion signal to a NOR circuit, whose the other input is connected to the reset IC 42.

In FIG. 29, the same components as those of FIG. 1 are suffixed by the same numerals and will be no more explained. Referring now to FIG. 29, the insertion/extraction control of the memory card will be explained in detail.

By inserting the memory card 12 into the connector 11 provided in the apparatus main body, the CD1 and CD2 disposed at both ends of connecting pins are grounded in the memory card 12. These CD1 and CD2 therefore becomes a LOW-level; therefore the card insertion signal, which is OR result of these CD1 and CD2 signals, becomes a LOW-level.

In response to this LOW-level signal, the PPI 45 feeds a HIGH-level power enable signal to the switching transistor 43 and a HIGH-level bus enable signal to the buffer 44. Furthermore, the PPI 45 feeds a HIGH-level reset enable signal to one input terminal of the AND circuit, whose the other input terminal is connected to another AND circuit inputting both the power enable signal and the bus enable signal. An output of this AND circuit is the reset enable signal of the memory card 12. This reset enable signal is inputted into an clear terminal of the flip-flop 46. As long as the memory card 12 runs its program, this flip-flop 46 feeds a LOW-level signal to one input terminal of the NOR circuit whose the other input terminal is connected to the reset IC 42. If either of the flip-flop 46 or the reset IC 42 inputs a HIGH-level signal into the NOR circuit, a reset signal of LOW-level will be fed from this NOR circuit to the CPU 1.

Next, a reset action of the CPU 1 will be explained. First of all, if an electric power voltage supplied to the system is lowered due to turning off of electric power or other reasons, the reset IC 42 will generates a reset signal at the time when the voltage reduces to a predetermined level within a range wherein the CPU 1 causes no malfunction. With this arrangement, the CPU 1 can terminate its action without causing malfunction due to excessive voltage drop. As this reset signal is inputted into the NOR circuit which is connected most closest to the reset terminal of the CPU 1, the reset control of the CPU 1 can be performed regardless of the presence of the memory card 12.

Next, the reset control by the extraction of the memory card 12 will be explained. If the memory card 12 is extracted from the connector 11, the CD1 and CD2 will be non-grounded or HIGH-level. This HIGH-level card insertion signal is inputted into the NOR circuit through the flip-flop 46. The NOR circuit outputs a LOW-level signal to the reset terminal of the CPU 1, thereby resetting the CPU 1 without causing malfunction due to extraction of memory card.

Even if the memory card 12 is surely inserted in the connector 11, the flip-flop 46 receives no reset enable signal at its clear terminal when the memory card runs no program. Therefore, the CPU 1 is not reset when the memory card is extracted. Because no HIGH-level signal is transmitted to the NOR circuit by the interruption of the flip-flop 46.

6. System Operation with Memory Card

Figure 30:
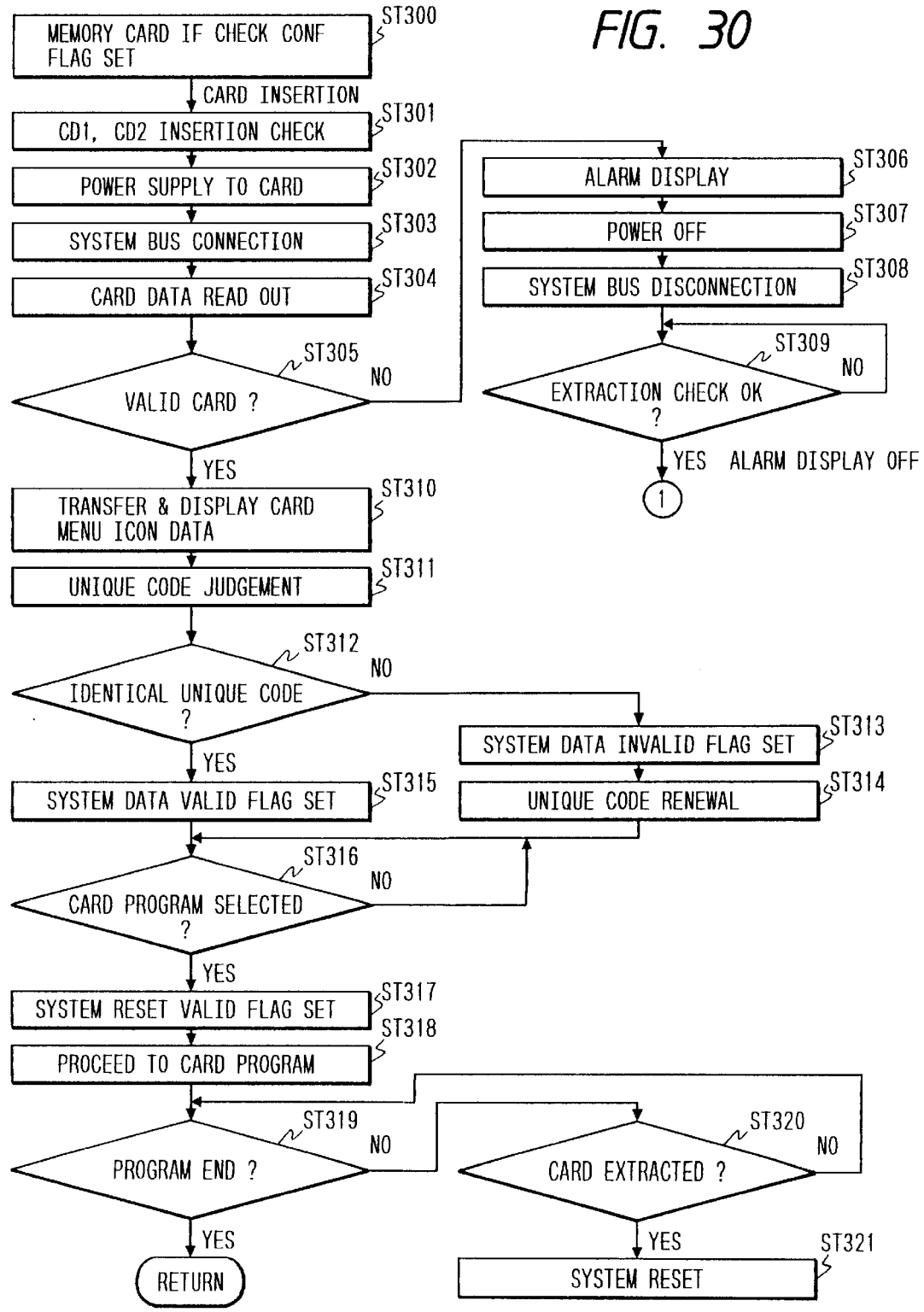
FIG. 30 is a flowchart showing an action of the information processing system of this embodiment with a memory card functionally incorporated therein.

FIG. 30 is a flowchart showing an action of the information processing system of the present invention with a memory card functionally incorporated therein. This action flow is processed when the presence of memory card is detected through the judgement of the step ST3 in FIG. 6.

In FIG. 30, if the memory card is inserted when the system is in the stand-by condition in a step ST300 (memory card IF check confirmation flag is set), it is checked in a step ST301 whether or not the CD1 and CD2 turn to LOW-level. If no memory card is inserted in the step ST300, the CPU 1 resumes the main program and the LCD 2 displays the initial screen of FIG. 10 which shows no memory card is contained. If the memory card is inserted in the step ST300, the power enable signal is outputted to the switching transistor so as to supply electric power to the memory card in a step ST302 and the bus enable signal is outputted to the buffer 44 so as to connect the CPU 1 and the memory card 12 in a step ST303. Then, an attribute information is read out from a specific address in the ROM 122 of the memory card 12 in a step ST304. Hereinafter, this attribute information will be explained.

Figure 31:
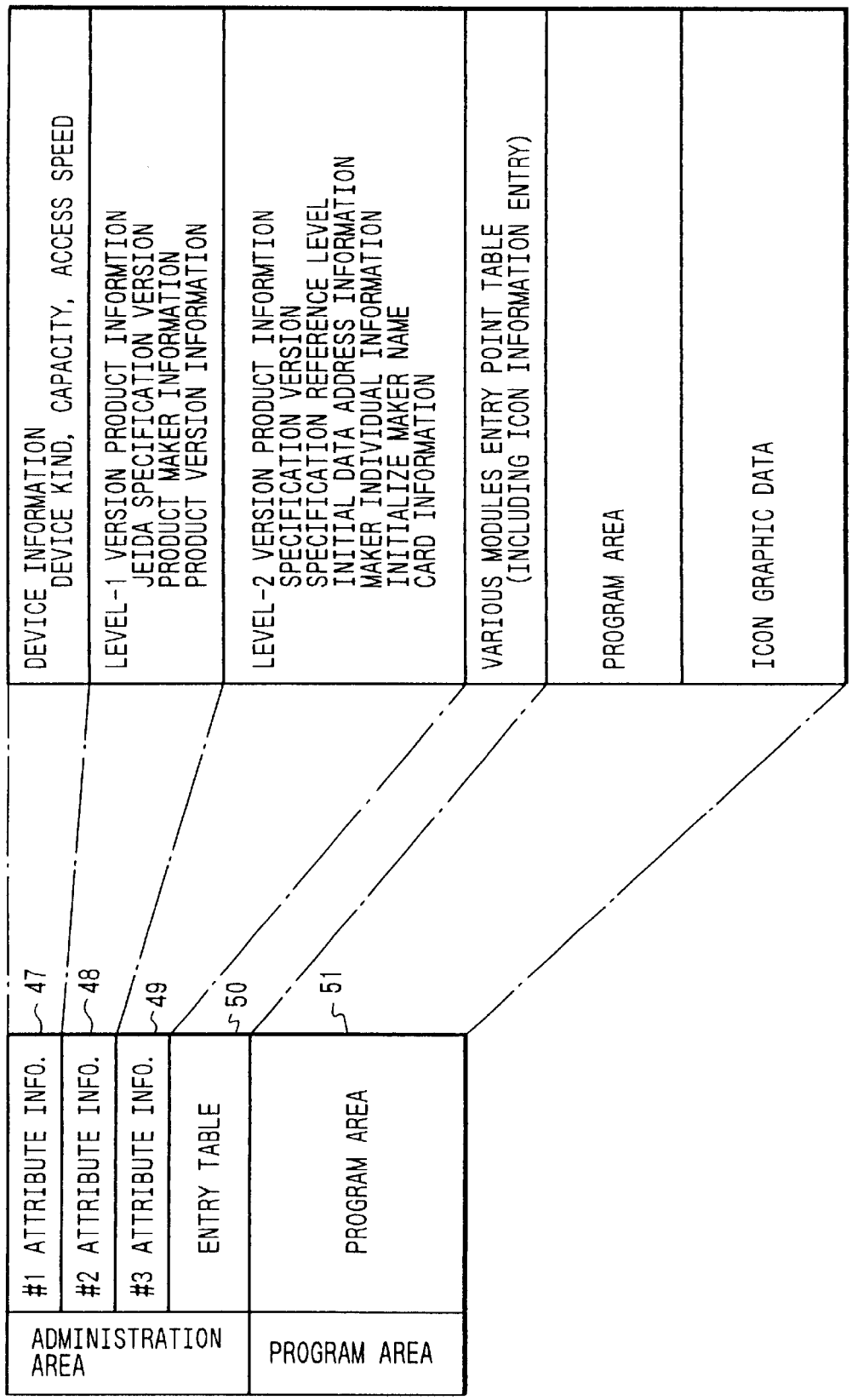
FIG. 31 is a view showing a memory map of the memory card used in this embodiment.

FIG. 31 shows a memory map of the memory card used in this embodiment. In FIG. 31, first attribute information 47 is a device information which stores device kind, capacity, and access speed of the memory card. Second attribute information 48 is a level-1 version product information which stores JEIDA (Japan Electronic Industry Development Association) specification version, product maker information, and product version information. Third attribute information 49 is a level-2 version product information which stored specification version, specification reference level, initial data address information, maker individual information, initialize maker name, and card information. An entry table 50 memorizes where each module or entry point table including icon information is stored in this memory card. A program area 51 stores programs and graphic data of various icons.

After reading out the attribute information, the CPU 1 checks in a step ST305 whether or not the attribute of the memory card is valid to the system. If invalid, an alarm is indicated in a step ST306 and the electric power supply to the memory card is stopped in a step ST307. Furthermore, the memory card is disconnected from the system bus in a step ST308. Thereafter, it is checked in a step ST309 if the memory card is extracted or not? If the memory card is extracted, the alarm indication is stopped and the CPU 1 returns to the stand-by condition.

The CPU 1 detects in the step ST305 that the attribute of the memory card is valid. Then in a step ST310, the CPU 1 transfers menu icon data, memorized in the form of dot image, from the EEPROM 123 of the memory card 12 to the VRAM 4 and displays it. In this case the CPU 1 obtains an address, storing the dot image of the menu icon data, from the entry table 50. If this memory card contains a menu icon data produced and memorized optionally by a user, the CPU 1 obtains from the entry table 50 an address storing the dot image representing this user defining menu icon data. As the menu icon data are basically memorized in the form of dot image, this embodiment allows users to optionally create icon data. FIGS. 11 and 12 are the screens displayed on the LCD 2 in this case. As apparent from these drawings, there is no difference between menu icons displayed on the LCD 2. In other words, these icons displayed on the LCD 2 are so similar that it is impossible to identify whether each icon belongs to the memory card or the system.

After displaying the menu icon data on the LCD 2, the CPU 1 judges whether or not a unique code of the RAM 8 coincides with a unique code of the EEPROM 123 in a step ST311. More specifically, the unique code (i.e. ID) is time data such as month, day, hour, minute, and second. And this time data is generated by a clock in the information processing apparatus when the memory card is inserted into the information processing apparatus. As the judgement of valid/invalid about the data memorized in the RAM 8 can be performed through this judgement in the step ST311, there is no necessity of initializing the RAM 8 every time when the memory card is inserted or extracted. Furthermore, if an inserted memory card is identical to the previously extracted memory card, the information already memorized in the ROM 8 can be utilized without any change. No down load of necessary data will be required also.

When the unique codes are not identical with each other in the step ST312, a system data invalid flag is set in the RAM 8 in a step ST313 and renews time data to coincide with that of the memory card in a step ST314.

When the unique codes are identical with each other in the step ST312, a system data valid flag is set in the RAM 8 in a step ST315 and no renewal of time data of the RAM 8 is carried out.

Thereafter, the CPU 1 judges in a step ST316 whether or not the program of the memory card is selected. If the card program is selected, a system reset valid flag is set in a step ST317 and proceeds to the card program in a step ST318. Subsequently, the CPU monitors the extraction of the memory card in a step ST320 until the card program ends in a step ST 319.

If the memory card is extracted when the card program is still running, an arrangement of FIG. 29 will reset the system in a step ST321 to protect self run away phenomenon. Accordingly, it becomes possible to insert or extract without turning off the electric power of the system. Even if the electric power is broken down due to some extraordinariness, the CPU 1 will cause no malfunction and also the data of the memory card will be adequately protected.

Furthermore, the system in accordance with this embodiment allows, even if the system is reset in the step ST321, to use the data memorized in the RAM 8 by checking the previously described unique codes unless a different memory card is inserted. This enables the system to immediately resume the previous condition after reset.

If the data memorized in the ROM 8 is maintained valid for a while until the different card is surely selected after the coincidence check of the unique codes, it will become possible to prevent the data in the RAM 8 from being undesirably aborted when another memory card is mistakenly inserted.

7. Inquiry and Communication Operation

Next, an inquiry and communication action of this embodiment of the present invention will be described with reference to FIGS. 32(a), 32(b) and 33 through 54.

Figure 54:
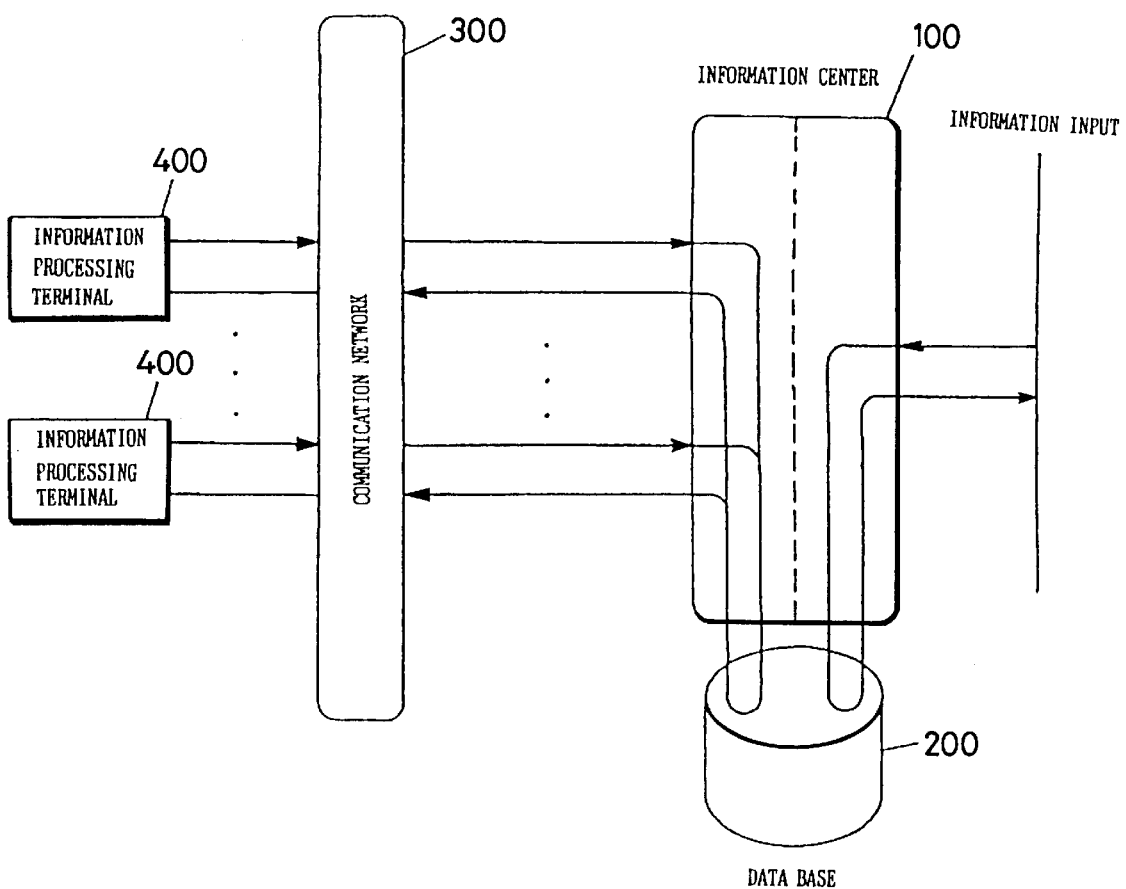
FIG. 54 is a view showing a generic construction of an inquiry and communication system.

Recent development in the information processing system has realized the banking systems, captain systems, personal computer communications and the like. FIG. 54 shows a generic construction of an inquiry and communication system. In FIG. 54, an information center 100 receives information offered from data sources and occasionally registers and renews them to construct a data base 200. These data base 200 are normally accessible from an information processing terminal 400 through a communication network 300. Upon retrieval request from the information processing terminal 400, the information center 100 provides a requested information from the data base 200 to the terminal 400. The information provided from the data base 200 is normally displayed on a display apparatus provided in the terminal 400 or fed to a recording apparatus.

Figure 32A:
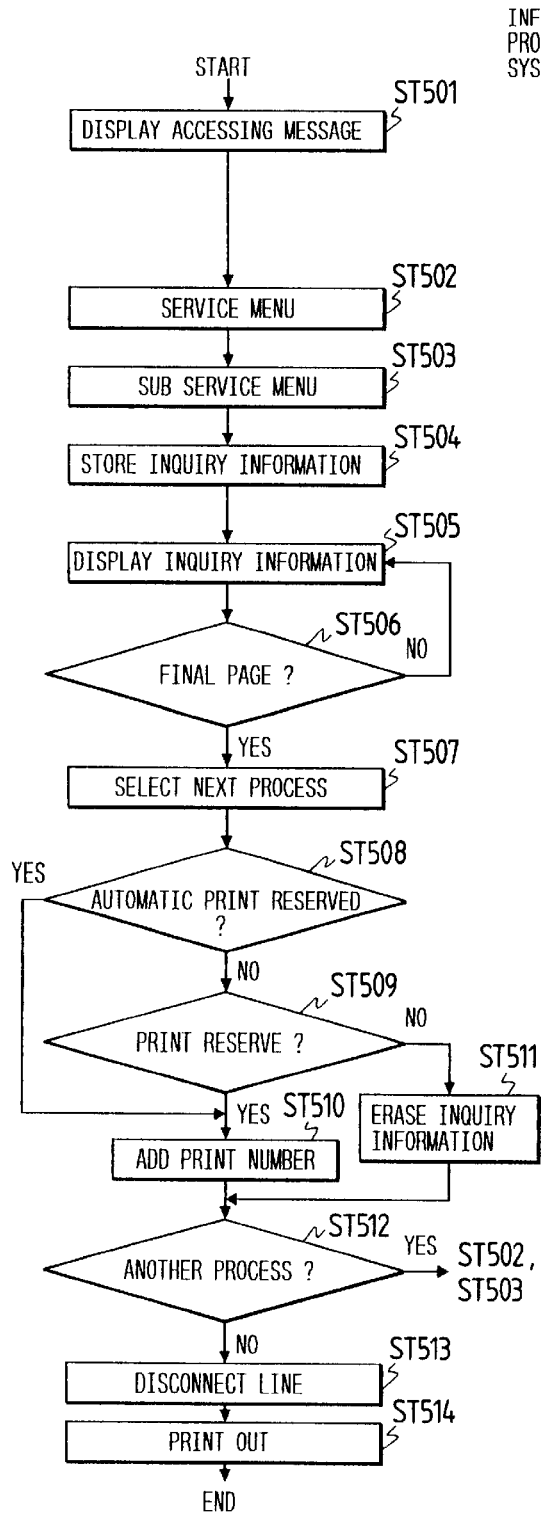
Figure 32B:
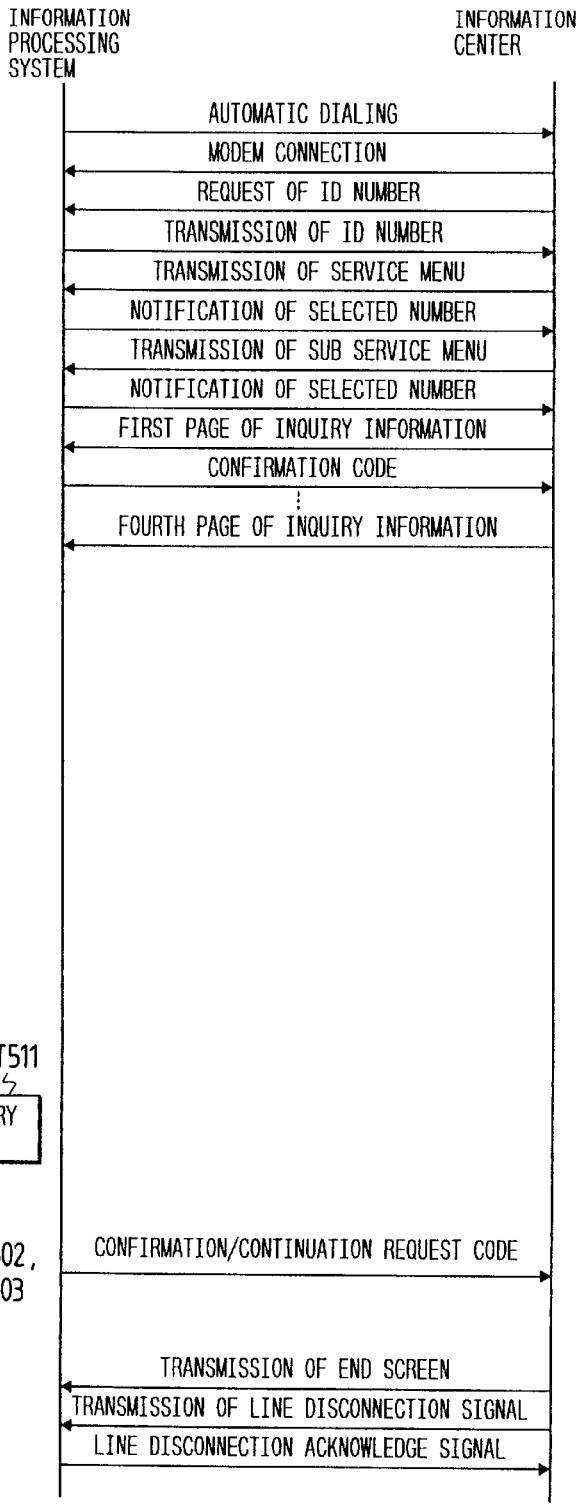
FIG. 32(b) is a time sequence showing this inquiry and communication action.

First of all, FIG. 32(a) is a flowchart showing an inquiry and communication action of this embodiment, while FIG. 32(b) is a time sequence showing this inquiry and communication action.

Figure 33:
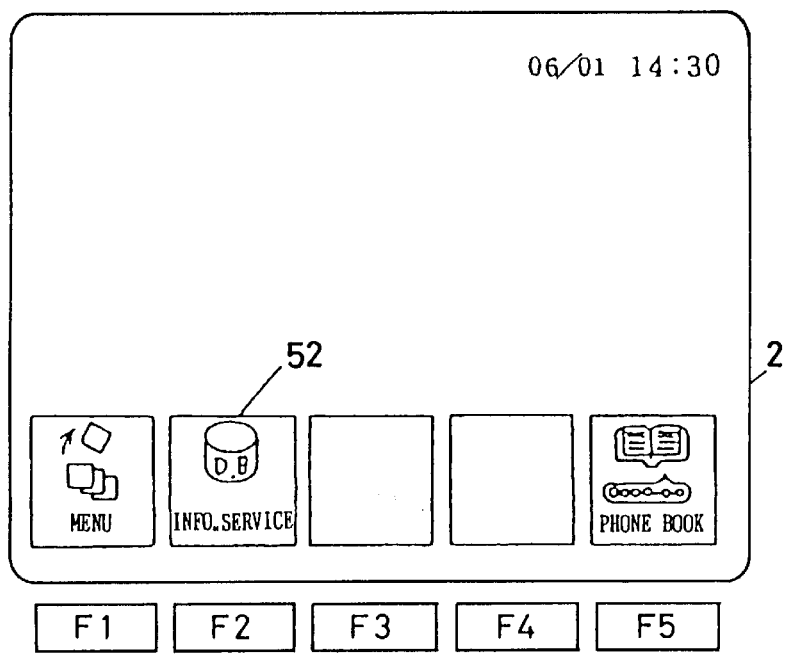
FIG. 33 is a view showing an initial screen including an information inquiry function.

FIG. 33 is an initial screen including an information inquiry function. This initial screen is displayed when the memory card 12, memorizing a communication application program compatible with various information processing centers, is inserted into the connector 11 of the system main body. An information inquiry icon 52 is displayed within a corresponding function frame on the LCD 2, that informs an operator of the information inquiry service being available.

Figure 34:
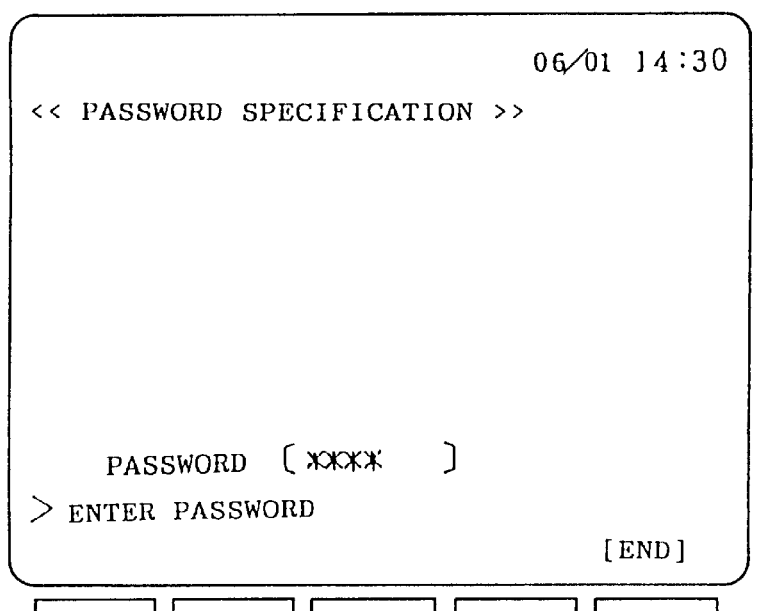
FIG. 34 is a view showing a password input screen.

If the function frame F2 is depressed, the display on the LCD 2 is changed to a screen of FIG. 34 which instructs an operator to enter a password. Next, if the execution/correction key 30 on the operation panel is depressed after inputting a predetermined password, it is judged whether or not the input password is correct. If judged correct, a main menu of the information service is displayed on the LCD 2 as shown in FIG. 35.

Upon selection of, for example, "1: RECEIVE INFORMATION RETRIEVAL SERVICE" through the numerical keys 27 on the operation panel, the display on the LCD 2 is changed to a screen of FIG. 36. In order to specify an information center, a center code and a subscriber number are successively inputted. Then, if one of numerous information centers is specified, the system comes into a condition for waiting for an ID (identification) number. A space 53 for "MEMO" may be used by a user for inputting optional information such as an information center name.

Next, once the ID number is inputted as shown in FIG. 37, a new indication "CONNECT" is displayed just above the function switch F1. If the operator depressed this function switch F1, the action flow of FIG. 32(a) will be executed.

In FIG. 32(a), a message "NOW ACCESSING: WAIT A MOMENT, PLEASE" is displayed in a step ST501. In this instance, a procedure necessary for connecting the system with the information center is executed. That is, the system automatically dials the telephone number of the information center having been registered beforehand. If the line is connected, a modem connection is next performed in compliance with the connect regulation for personal computer communication modems (an advice V25 by CCITT). Then, the message "NOW ACCESSING: WAIT A MOMENT, PLEASE" flashes on the LCD 2.

If the connection between the system and the information center is completed, the information center requests an ID number of the system or capacity information. In response to this request, the system automatically returns the ID number registered. In a step ST502, a service menu is displayed on the LCD 2. Namely, after confirming the ID number of the system, the information center transmits the service menu reserved therein to the system.

The operator selects one of items in the service menu by inputting corresponding service number through the numerical keys 27. Thus selected number is transmitted to the information center. As the service menu has a structure in the form of tree, a sub service menu is displayed as shown in FIG. 40 in a step ST503. With this hierarchical tree structure the content of the menu can be classified into a multi-level form; hence the user can perform a desired information retrieval by simply manipulating the numerical keys 27. The function switch F4, above which an indication "NEXT PAGE" is displayed, may be depressed in the case where a service menu or sub service menu bridges a plurality of pages.

In a step ST504, the inquiry information selected in the steps ST502 and ST503 is stored. (The LCD 2 does not display this inquiry information specially.) The selected inquiry information is transmitted to the information center, which thereafter retrieves the data base 200 to collect the requested information and reads out them as the resultant inquiry information. The resultant inquiry information are successively transmitted from the information center to the system, which then returns a confirmation code every time when a complete one page has been received. The system, however, sends out no confirmation code when the last page has been received. Instead, a confirmation/continuation request code will be transmitted to the information center as will be described later in a step ST512. In other words, this confirmation/continuation request code represents the last page of the resultant inquiry information having been read out, and also indicates the next process (i.e. continuation of retrieval or interruption of retrieval).

Figure 48:
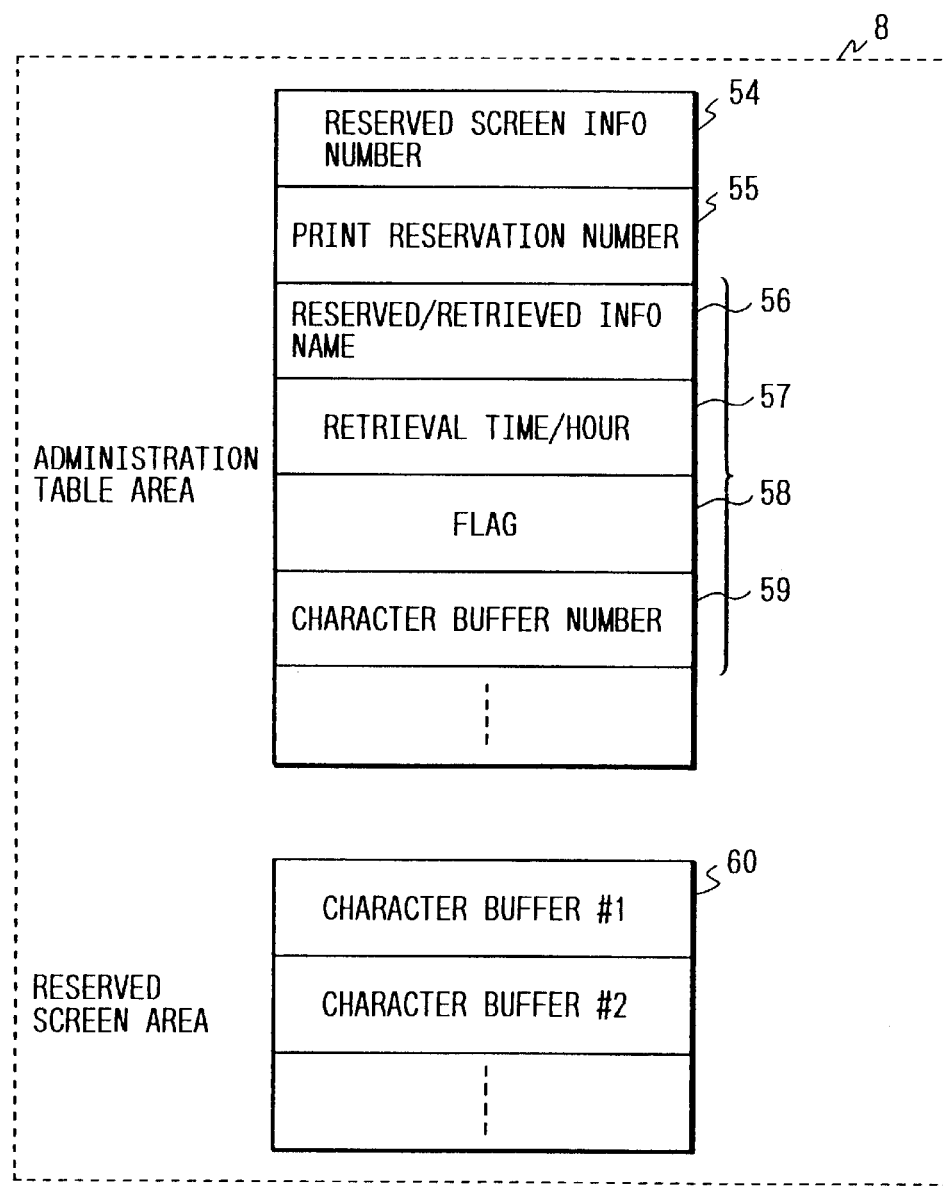
FIG. 48 is a view showing a detailed structure of the RAM storing inquiry information.

The resultant inquiry information are successively stored in the RAM 8. FIG. 48 shows a detailed structure of the RAM 8. The RAM 8 essentially consists of an administration table area and a reserved screen area. The administration table area comprises a reserved screen information number 54, a print reservation number 55, a reserved/retrieved information number 56, a retrieval time/hour 57, a flag 58 representing e.g. total pages of the resultant inquiry information, and a character buffer number 59 representing a character buffer number storing the resultant inquiry information. On the other hand, the reserved screen area stores the resultant inquiry information classified in accordance with the character buffer number 59. Although the RAM 8 is divided into two, administration table and reserved screen, areas, it is needless to say that two RAMs can be provided exclusively for these areas.

The number of pages allowed for the print reservation is restricted by the number of the character buffers 1, 2 - - - in the reserved screen area. When the reserved screen area is filled up, the system disconnects the line and prints out the reserved screens. If the reserved screen area is filled at an intermediate portion of a page, this page will not be printed out.

Then, if the line is disconnected before the retrieval is finished, the display on the LCD 2 resumes a main menu shown in FIG. 47 after finishing the printout operation. This main manu of FIG. 47 is displayed only when the line is disconnected during the retrieval, and is different from the previous main menu in that an item "6. CONNECT LINE AGAIN" is additionally displayed. This item allows, if selected, an automatic return to the interrupted retrieval without repetition of the same manual procedure.

In a step ST505, a first page of inquiry information is displayed on the LCD 2 after all the resultant information is stored in the RAM 8, Then, it is checked in a step ST506 whether or not the inquiry information page displayed present is last. If not, an indication "NEXT PAGE" is displayed above the function switch F4. An operator may depress this function switch F4 to see the next page. In this manner, the operator can confirm every page by successively displaying it on the LCD 2.

When the inquiry information page is last, the CPU 1 proceeds to a step ST507 wherein the display questions whether or not the next retrieval should be done. In this case an indication "CONTENTS" is displayed above the function switch F2, also an indication "CONTINUE" the function switch F3 and an indication "END" the function switch F5, respectively. (Refer to FIGS. 41, 42, 43, and 44) If the "CONTENTS" is selected, the display screen returns to the menu screen. In the same manner, if the "CONTINUE" is selected, the display screen returns to the sub service menu screen, and if "END" to the procedure for disconnecting the line.

Next, it is judged in a step ST508 whether or not an automatic print is reserved. If automatic print is selected, all the inquiry information is successively stored in the RAM 8. And, the number of the inquiry information is added as a print number in a step ST510.

If the automatic print is not selected, a question "DO YOU WANT RESULTANT INFORMATION PRINTED ?" is displayed on the LCD 2 as shown in FIG. 45 in a step ST509. Then, if the function switch F1, above which an indication "YES" is displayed, is depressed the print reservation of the displayed inquiry information is completed. The print reservation in the step ST510 is carried out in the following manner.

In the RAM 8, the reserved screen information number area 54 memorizes an inquiry information number stored in the RAM 8, i.e. a summation of previously reserved inquiry information number and a presently received screen number. Next, the inquiry information number, having been reserved a printing, is counted occasionally. The count result is stored in the RAM 8 as a print reservation number 55. This print reservation number is, for example, displayed on the display screen as shown in FIG. 41.

On the other hand, if the print reservation is not selected in the step ST508, the following procedure will be performed. Namely, the inquiry information stored in the step ST504 is erased. More particularly, this inquiry information or its related data are erased from the memory areas of the reserved/retrieved information name 56, the retrieved time/hour 57, the flag 58, the character buffer number 59, and its corresponding character buffer 60. In this case, the print reservation number 55 is not incremented and holds the previous number. Also, the reserved screen information number 54 is subtracted by an amount of the presently received inquiry information pages so as to coincide with the print reservation number 55.

Furthermore, if "CONTENTS" or "CONTINUE" was selected in the step ST507, the CPU 1 proceeds to the step ST502 in case of "CONTENTS" or ST503 in case of "CONTINUE" in s step ST512. If "END" is selected in the step ST507, the CPU 1 proceeds to the step ST513 wherein the line is disconnected. In more detail, an end screen shown in FIG. 46 is displayed in this step ST513, which informs an user of a communication charge. Thereafter the information center sends out a line disconnection signal; while the system returns a line disconnection acknowledge signal to the information center. Then the line is finally disconnected.

Next, the system checks whether or not the print reservation number reserved in the step ST509 is 0. If the print reservation number is 0, the display screen returns to the initial screen. If not, the CPU 1 performs a predetermined condition check including, e.g. paper remaining amount, door open. If the normal condition of apparatus is confirmed through this condition check, the print operation of the acquired inquiry information is carried out in a step ST514. In this step ST514 a screen of FIG. 46 is displayed, which includes an message "NOW PRINTING: WAIT A MOMENT, PLEASE." flashing at the bottom. And all the designated inquiry information is printed out.

If the electric power of the system is accidentally broken down during the inquiry information retrieval, it is necessary to turn on the electric power and enter the password again to print out the inquiry information stored in the RAM 8. The RAM 8 has a memory structure capably of preventing the stored information from being aborted even if the electric power is broken down.

8. Printout Operation

The printout action of this embodiment will be explained below with reference to FIGS. 49 through 53, which respectively shows a print format (or pattern).

Header information of the reserved/retrieved information name storing area 56, the retrieved time/hour storing area 57, and the flag storing area 58 are transmitted the printer 22. The printer 22 is equipped with a buffer memory (not shown) capably of storing full data of 1 line. The header information are stored as code information, which will be later transformed by the CG2 into font data to be printed out.

After the printing out operation of the header information, the inquiry information is printed out. In this case, it is judged from the flag storing area 58 whether or not the pages of the inquiry information is plural. In case of plural pages, these inquiry information are printed as a series of information in a format shown in FIG. 49.

Then, if another reserved/retrieved information name is stored in the administration table area, it is judged that another inquiry information retrieved in accordance to another service menu is stored. Therefore, this another inquiry information is printed together with new header information. As each inquiry information is paired with the header information, no confusion will occur in the printing operation. For example, different kinds information will not be printed out together in a mixed condition.

The RAM 8 stores these header information. By checking flags identifying individual header information, it will be found that these plural inquiry information are a series of information. The flag represents, for example, the page number 1, 2, - - - of the inquiry information. Based on this page number, the order of the inquiry information can be known.

By the way, the character buffer stores these inquiry information in the form of code information. A line end mark representing an end of a line is also stored.

Assuming that three screens are arrayed in the same record sheet along the main scanning direction, a first line data of each screen is successively transmitted to the buffer memory in the order of No.1 screen, No.2 screen, and No.3 screen.

The buffer memory has a capacity sufficient to hold the inquiry information amount equivalent to the printed characters number (15 characters in this embodiment)×3 per line. The inquiry information of No.2 screen is stored from 16th character from the left, and the No.3 is from 31st.

After transmitting all the first lines of three, from No.1 to No.3, screens, the CG2 transforms these code information into font data. Then, these font data will be printed out. As the three screens are printed together by being arrayed along the main scanning direction as apparent from the explanation above, a record sheet can be effectively used without wasting its righthand space.

Furthermore, in FIG. 49, the retrieval information such as the center code and service name, inputted in advance for retrieval in the data base of the information center, are printed together as header information.

In the case where the information processing system of this embodiment is a facsimile type, the LCD 2 will be able to display 20 full-size characters along the main scanning direction. Among them, 14 characters from the left end will be used for the display of inquiry information. It will be necessary to take 24 dots for a print character font and 8 dots for a clearance between characters, and hence 32 dots in total for one character. A lateral dot number of the 14 characters on the LCD 2 is 32×14=448. On the other hand, an A4 sized record paper has a width of 1680 dots/210 mm. Therefore, not only the simultaneous printing of three screens being laterally arrayed becomes possible but there is still some margins remaining (1680=448×3+336).

FIGS. 50 through 53 respectively shows a print format. Although the print format of FIG. 49 surrounds each block of information by a dotted line frame, using such an image information of dotted line frame can surely make the display easy to see.

The print format shown in FIG. 50 is similar to that of FIG. 49 but different in using a solid line frame. The print format shown in FIG. 51 is different in using an image information representing a corner. Providing only one corner per information block would bring the same effect as the print format of FIG. 50. It will be advantageous in reducing an overall printing time.

The print format shown in FIG. 52 is similar to that of FIG. 51 but different in using a laterally elongated corner line. The print format shown in FIG. 53 is similar to that of FIG. 52 but different in substituting a dotted line for a solid line. These image information composed with the inquiry information are memorized in an appropriate memory means such as the RAM 8 in advance, and it is needless to say that various modification will be further possible.

As this invention may be embodied in several forms without departing from the spirit of essential characteristics thereof, the present embodiment is therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. An information communication system comprising:

an information retrieval means for retrieving, via a public communication line, a data base stored in an information center;

a display means for displaying resultant retrieval data as inquiry information;

an operation means for requesting a printout of said inquiry information displayed on said display means;

a memory means for temporarily memorizing the inquiry information as printout objective specified by said operation means; and a printing means for printing out said inquiry information stored in said memory means at a time after the communication line is disconnected, said printing means suspending printout of said inquiry information stored in said memory means until said communication line is disconnected and executing a batch printout operation for said inquiry information stored in said memory means after said communication line is disconnected.

2. An information communication system comprising:

an information retrieval means for retrieving, via a public communication line, a data base stored in an information center;

a display means for displaying resultant retrieval data as inquiry information;

a memory means for temporarily memorizing the inquiry information displayed by said display means as printout objective; and a printing means for printing out a plurality of inquiry information stored in said memory means on a record medium so that recording areas of said plurality of inquiry information are arrayed parallel to each other along a main scanning direction of the record medium to save a recording space of said record medium.

3. An information communication system in accordance with claim 2, wherein an image information is provided to separate adjacent two recording areas.

4. An information communication system in accordance with claim 2, wherein said image information is provided at least one of four corners of each recording area.

* * * * *